United States Patent
Tabata et al.

(10) Patent No.: US 10,308,525 B2
(45) Date of Patent: *Jun. 4, 2019

(54) SUSPENDED-MATTER REMOVING METHOD UTILIZING BIOFILM AND SUSPENDED-MATTER REMOVING APPARATUS UTILIZING BIOFILM

(71) Applicant: MITSUBISHI HEAVY INDUSTRIES, LTD., Tokyo (JP)

(72) Inventors: Masayuki Tabata, Tokyo (JP); Seiji Furukawa, Tokyo (JP); Katsunori Matsui, Kanagawa (JP); Hideo Suzuki, Tokyo (JP); Gaku Kondo, Tokyo (JP); Shigeru Yoshioka, Tokyo (JP); Masaki Ishiguro, Tokyo (JP)

(73) Assignee: MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/551,470

(22) PCT Filed: Feb. 20, 2015

(86) PCT No.: PCT/JP2015/054886
§ 371 (c)(1),
(2) Date: Aug. 16, 2017

(87) PCT Pub. No.: WO2016/132556
PCT Pub. Date: Aug. 25, 2016

(65) Prior Publication Data
US 2018/0036658 A1    Feb. 8, 2018

(51) Int. Cl.
*C02F 1/00* (2006.01)
*C02F 1/28* (2006.01)
(Continued)

(52) U.S. Cl.
CPC .............. *C02F 1/001* (2013.01); *B01D 35/22* (2013.01); *B01D 37/02* (2013.01); *B01D 39/06* (2013.01);
(Continued)

(58) Field of Classification Search
CPC ................ C02F 1/001; C02F 2209/005; C02F 2209/10; B01D 2239/065; B01D 35/22; B01D 37/02; B01D 39/06
(Continued)

(56) References Cited

U.S. PATENT DOCUMENTS

2018/0028946 A1*   2/2018   Tabata ................... B01D 37/02

FOREIGN PATENT DOCUMENTS

JP          53-76544 A      7/1978
JP          63-143917 A     6/1988
(Continued)

OTHER PUBLICATIONS

Takeuchi, K. et al., "The study of environmentally friendly pretreatment system", Desalination and Water Treatment, 2012, vol. 51, Issue 7-9, pp. 1874-1880.
(Continued)

*Primary Examiner* — Claire A Norris
(74) *Attorney, Agent, or Firm* — Westerman, Hattori, Daniels & Adrian, LLP

(57) ABSTRACT

A suspended-matter removing method and a suspended-matter removing apparatus are disclosed that require no sludge treatment facility, and inexpensively provide filtrate satisfying a water quality standard. The suspended-matter removing method includes: feeding a protrusion element to a filter layer formed by filling a solid filter material, adding a protrusion to a surface of the solid filter material; after feeding protrusion element, determining whether a protrusion has been added to the surface of the solid filter material,
(Continued)

and when it is determined that the protrusion has been added, reducing a feeding amount of the protrusion element as compared with when adding the protrusion; forming a biofilm on the surface of the solid filter material; and passing water to be treated containing suspended matters through the filter layer having the solid filter material added with the protrusion in a state in which the feeding amount of the protrusion element is reduced.

24 Claims, 23 Drawing Sheets

(51) Int. Cl.
    *B01D 35/22*     (2006.01)
    *B01D 37/02*     (2006.01)
    *C02F 1/44*     (2006.01)
    *C02F 3/10*     (2006.01)
    *B01D 39/06*     (2006.01)
    *B01D 61/04*     (2006.01)
    *C02F 1/76*     (2006.01)
    *B01D 61/02*     (2006.01)
    *C02F 1/469*     (2006.01)
    *C02F 103/08*     (2006.01)

(52) U.S. Cl.
    CPC .............. *B01D 61/04* (2013.01); *C02F 1/441* (2013.01); *C02F 3/10* (2013.01); *B01D 61/025* (2013.01); *C02F 1/283* (2013.01); *C02F 1/4693* (2013.01); *C02F 1/76* (2013.01); *C02F 2103/08* (2013.01); *C02F 2209/11* (2013.01); *C02F 2301/022* (2013.01); *C02F 2303/16* (2013.01); *C02F 2303/185* (2013.01); *C02F 2303/24* (2013.01); *Y02W 10/15* (2015.05)

(58) Field of Classification Search
    USPC .......................... 210/143, 616, 618, 631, 702
    See application file for complete search history.

(56) References Cited

FOREIGN PATENT DOCUMENTS

| | | |
|---|---|---|
| JP | 63-294917 A | 12/1988 |
| JP | 2-63510 A | 3/1990 |
| JP | 8-71334 A | 3/1996 |
| JP | 2004-130197 A | 4/2004 |

OTHER PUBLICATIONS

Costerton, J. W. et al., "Microbial Biofilms", Annual Reviews of Microbiology, 1995, pp. 711-745.
International Search Report dated May 26, 2015, issued in counterpart International Application No. PCT/JP2015/054886, with English translation. (5 pages).
Written Opinion dated May 26, 2015, issued in counterpart International Application No. PCT/JP2015/054886, with English translation. (18 pages).

\* cited by examiner

FIG. 10
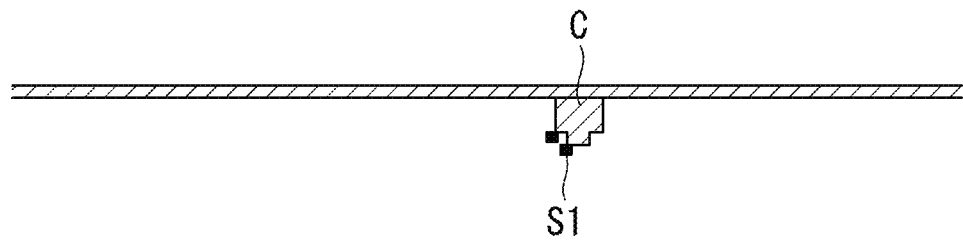
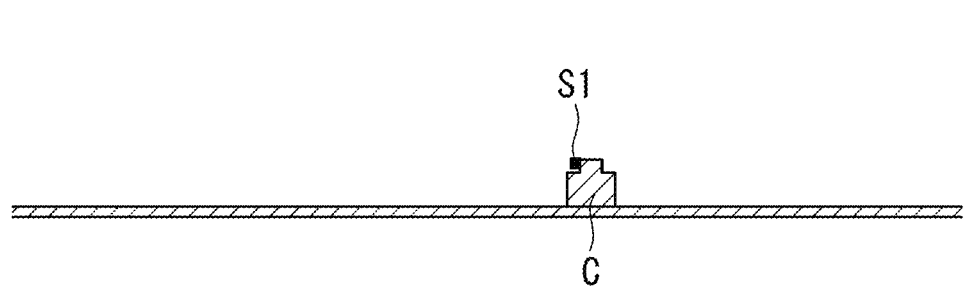
FIG. 11
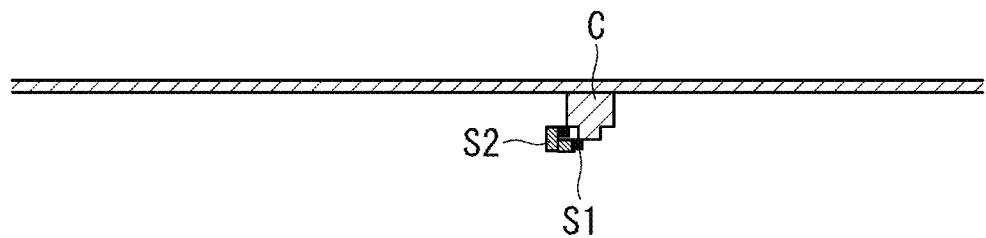
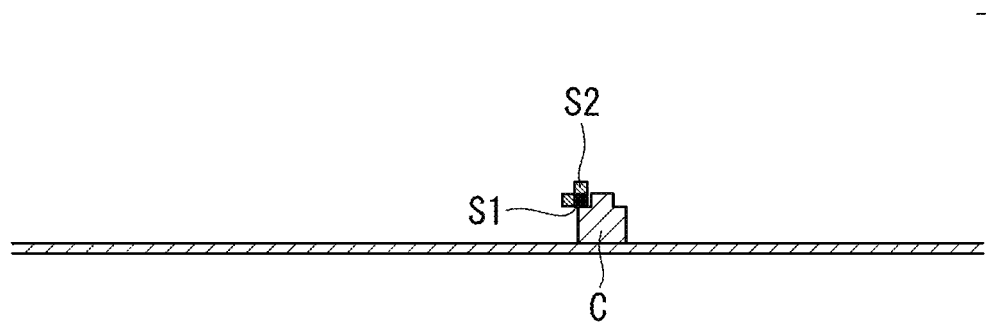

ical field

The present invention relates to a suspended-matter removing method and a suspended-matter removing apparatus. The present invention particularly relates to a suspended-matter removing method utilizing a biofilm and a suspended-matter removing apparatus utilizing a biofilm that are used in a seawater desalination plant and a water treatment plant.

BACKGROUND ART

In recent years, as the seawater desalination market has been expanding due to global water shortage, seawater desalination plants are being constructed. As a technology for seawater desalination, there is known a method for producing fresh water by removing salt in seawater with a reverse osmosis membrane (RO membrane). A filtration apparatus using an RO membrane performs removal of suspended matters as a pretreatment.

In order to remove suspended matters, in general, a flocculant is continuously injected into the seawater to flocculate the suspended matters. As the flocculant, iron salt is used. This metal reacts with an alkaline component in the water to generate metal hydroxide.

The metal hydroxide acts as a binder, and collision and contact of suspended matters in the seawater cause conglomeration, generating flocs. An injection amount of the flocculant is increased and decreased in accordance with an amount of suspended matters in the seawater. For example, when iron salt is used as the flocculant, the iron salt is injected so as to be 0.5 to 10 ppm as iron in the seawater.

Other methods for separating suspended matters include filter filtration, centrifugation, and filtration using a solid filter material. A method using a solid filter material is advantageous in that it is inexpensive as compared with filter filtration or centrifugation, and easy to maintain. For the solid filter material, those sized to have a diameter of 300 to 2500 μm are typically used. When suspended matters to be removed are small, the flocculant is added to water to be treated to form flocs thereby to increase the size of an object to be removed, and then the filtration is performed. Here again, the flocculant is continuously injected to the water to be treated.

Continuous injection of the flocculant causes growth of the flocs, which makes it easier to capture the flocs with a downstream filter. However, the filter itself must be washed regularly to discharge flocs that have been deposited inside, to outside of the system. The flocs deposited in the filter are discharged from inside of the filter by backwashing.

As a method using a solid filter material, there is also known a method that utilizes a biofilm to separate suspended matters with a filter filled with a solid filter material without using a flocculant, as disclosed in NPL 1.

CITATION LIST

Non Patent Literature (NPL 1) Kazuhisa Takeuchi et al., "The study of environmentally friendly pretreatment system". Desalination and Water Treatment, Volume 51, Issue 7-9, February 2013, pages 1874-1880

SUMMARY OF INVENTION

Technical Problem

When a large amount of a flocculant is used in filtration using a solid filter material, flocs are captured at a filter layer, and a differential pressure of the filter layer is increased. An increase in the differential pressure makes it difficult for the water to be treated to pass, deteriorating removal efficiency. In order to reduce the differential pressure, the filter layer must be backwashed. The filter immediately after backwashing has a low removal rate (capture rate) of suspended matters, and requires long time (e.g., five hours or more) until the water quality of filtrate becomes stable, causing deterioration of water quality of the filtrate.

When a large amount of a flocculant is used in filtration using a solid filter material, flocs are captured at a filter layer, and a differential pressure of the filter layer is increased. An increase in the differential pressure makes it difficult for the water to be treated to pass, deteriorating removal efficiency. In order to reduce the differential pressure, the filter layer must be backwashed. However, the filter layer immediately after backwashing has a low removal rate (capture rate) of suspended matters, and requires long time (e.g., five hours or more) until the water quality of filtrate becomes stable, causing deterioration of water quality of the filtrate.

Although various mechanisms are considered as a suspended-matter removal mechanism by filtration using a solid filter material, for example, screening, removal by an interception effect of sedimentation or the like in a stagnant pool in a void or a gap, or adhesion/adsorption (electrostatic, intermolecular force, or cohesion), they have not been fully elucidated at present. Thus, there are problems in improvement of a removal rate, and in stabilization of load fluctuation or water quality of filtrate at starting.

When paying attention to the suspended-matter removal by interception among the removal mechanisms, a passage becomes smaller as a particle diameter of the solid filter material is smaller, enabling removal of smaller suspended matters. Moreover, using a smaller solid filter material increases a specific surface area of the solid filter material, which can increase a removal rate of fine suspended matters that can be captured on a surface of the solid filter material by Brownian motion.

However, when a small solid filter material is used, a pressure loss of the filter is large, and power of a water feed pump rises, increasing an operation amount. Moreover, since an operation pressure is high, a container that stores the solid filter material is required to have a higher pressure resistance, increasing cost for the apparatus. In other words, making a solid filter material smaller to improve a removal rate is in a trade-off relation with the cost.

An apparatus that utilizes a biofilm to remove (separate) suspended matters, as in NPL 1, requires about two weeks to one month until the biofilm grows to provide a removal effect. Moreover, a suspended-matter removing apparatus utilizing a biofilm has a problem that, when operation of the apparatus is stopped, removal performance temporarily drops, and a time (e.g., five hours or more) is required for recovery. Further, there is also a problem that a suspended-matter removing apparatus utilizing a biofilm cannot follow a rapid change of a suspended-matter concentration in water to be treated.

The present invention has been made in view of the above circumstances, and it is an object of the present invention to provide a suspended-matter removing method utilizing a biofilm and a suspended-matter removing apparatus utilizing a biofilm that require no sludge treatment facility, and inexpensively provide filtrate satisfying a desired water quality standard. It is also an object of the present invention to provide a suspended-matter removing method utilizing a biofilm and a suspended-matter removing apparatus utilizing a biofilm that can provide filtrate satisfying a desired water quality standard sooner than a conventional one at starting or at restarting after operation stop, and also follow a load fluctuation of water to be treated.

Solution to Problem

The inventors, as a result of intensive study, have obtained new knowledge that suspended matters of 0.1 to 10 μm are not easily removed by a conventional filtration method using a solid filter material. Based on this, the inventors have invented a suspended-matter removing method utilizing a biofilm and a suspended-matter removing apparatus utilizing a biofilm for removing suspended matters of 0.1 to 10 μm or less.

The present invention provides a suspended-matter removing method utilizing a biofilm, including the steps of feeding a protrusion element to a filter layer formed by filling a solid filter material, to add a protrusion to a surface of the solid filter material; determining whether or not a protrusion satisfying a preset standard has been added to the surface of the solid filter material; when it is determined that the protrusion has been added, reducing a feeding amount of the protrusion element as compared with when adding the protrusion; forming a biofilm on the surface of the solid filter material; and passing water to be treated including suspended matters through the filter layer having the solid filter material added with the protrusion in a state which the feeding amount of the protrusion element is reduced.

In the invention above, the protrusion is added to the surface of the solid filter material thereby to cause a microscopic change in a flow of the water to be treated in the filter layer, causing suspended matters having a size of 0.1 μm or more to 10 μm or less to be captured. This makes it possible to improve water quality of filtrate even when the water to be treated includes many suspended matters having a size of 0.1 μm or more to 10 μm or less. A fluctuation of water quality (load fluctuation) of the water to be treated is allowed, and the water quality of the filtrate can be stabilized.

In the invention above, since the protrusion element is fed to the filter layer so as to add a protrusion to the surface of the solid filter material, the protrusion can be stably added in a short time. The filter layer formed by filling the solid filter material added with the protrusion can stably remove (capture) suspended matters at a high removal rate (capture rate) from an initial stage of the step of removing suspended matters from the water to be treated. This can shorten a starting time of the filtration apparatus as compared with a conventional one.

In the invention above, suspended matters are removed from the water to be treated with the feeding amount of the protrusion element reduced, which can reduce sludge-generation amount as compared with when the protrusion element is continuously fed. This suppresses an increase in a differential pressure in the filter layer, allowing a backwashing interval to be prolonged.

In the invention above, forming the biofilm allows growth of the protrusion even after the feeding amount of the protrusion element is reduced. This can maintain suspended-matter removal performance at the filter layer and stabilize water quality of the filtrate.

In one aspect of the invention above, it is preferable to stop feeding of the protrusion element in the step of reducing the feeding amount of the protrusion element.

Stopping the feeding of the protrusion element enables suppression of sludge generation, eliminating necessity of a sludge treatment facility.

In one aspect of the invention above, there may be further included a step of passing the water to be treated through the filter layer in parallel with the step of adding the protrusion. This makes it possible to add a protrusion as required while filtering the water to be treated.

In one aspect of the invention above, it is preferable to include a step of inspecting water quality of the filtrate that has come out from the filter layer. When an inspection value of the filtrate exceeds a preset threshold value, it is determined that the protrusion satisfying a preset standard has not been formed on the surface of the solid filter material, and the step of adding the protrusion is performed. When the inspection value of the filtrate is equal to or less than the preset threshold value, it is determined that the protrusion satisfying the preset standard has been added to the surface of the solid filter material, and the feeding amount of the protrusion element is reduced as compared with when adding the protrusion.

Since the protrusion element forms a protrusion by adhering to the surface of the solid filter material, the protrusion may be stripped off. Moreover, a protrusion that has been adhered by a biofilm to grow is stripped of the biofilm when microorganisms are killed. When the protrusion or the biofilm is stripped off, a removal performance of the filter layer is also lowered, deteriorating water quality of the filtrate. According to the aspect described above, since the protrusion is added in accordance with the water quality of the filtrate, the water quality of the filtrate can be more stable.

In one aspect of the invention above, a step of measuring a differential pressure between a first side of the filter layer and a second side of the filter layer may be included, to feed the protrusion element within a range where the measured differential pressure is less than a predetermined value, in the step of adding the protrusion.

Excessively forming the protrusion to narrow a passage of water to be treated allows an interception effect to be enhanced, as with when a solid filter material with a small diameter is used. However, according to one aspect of the invention above, the filter layer is regenerated to be capable of capturing suspended matters having a size of 0.1 μm or more to 10 μm or less with a protrusion, without narrowing the passage to an extent allowing the enhancement of the interception effect. Keeping the differential pressure in the filter layer, which is generated by adding the protrusion, at less than the predetermined value, enables a lower initial differential pressure, and a longer backwashing interval.

In one aspect of the invention above, there may be included a step of directly or indirectly measuring an amount of a protrusion element contained in filtrate that has come out from the filter layer in the step of adding the protrusion, and it can be determined that the protrusion satisfying a preset standard has been added to the surface of the solid filter material when the measured amount of the protrusion element becomes equal to or less than a preset threshold value.

When the protrusion element is fed to the filter layer, the protrusion element adheres to the surface of the solid filter material to form a protrusion. In the step of adding the projection, a decrease in an amount of the protrusion element contained in the filtrate serves as an index indicating that the protrusion element has adhered to the surface of the solid filter material. Thus, according to the aspect described above, it is possible to add a protrusion required to capture suspended matters having a size of 0.1 µm or more to 10 µm or less.

In one aspect of the invention above, a total feeding amount of the protrusion element to the filter layer in the step of adding the protrusion may be counted, and it can be determined that the protrusion satisfying a preset standard has been added to the surface of the solid filter material when the counted total feeding amount reaches a preset threshold value.

Presetting a total feeding amount of the protrusion element to the filter layer allows desired protrusion to be easily added.

In one aspect of the invention above, in the step of passing the water to be treated, it is preferable to pass the water to be treated through a coarse-particle separation part to make it to be primarily treated water by mainly separating suspended matters larger than 10 µm contained in the water to be treated, and then pass the primarily treated water through the filter layer to remove suspended matters having a size of 0.1 µm or more to 10 µm or less.

Water to be treated containing many suspended matters with a large particle diameter may cause clogging in an early stage, duo to an interception effect. According to the aspect described above, since the coarse-particle separation part roughly removes suspended matters having a large particle diameter, a filtering part can remove suspended matters having a size of 0.1 µm or more to 10 µm or less with less influence of suspended matters having a large particle diameter. Thus, the water quality of the filtrate that has come out from the filtering part can be stabilized, the differential pressure in the filter layer becomes less likely to be generated, and a backwashing interval can be prolonged.

When water to be treated contains an oxidizing agent such as chlorine, in one aspect of the invention above, it is preferable to add sodium hydrogen sulfite to the water to be treated, and then pass the water to be treated through the filter layer.

This can remove residual chlorine in the water to be treated, enabling elimination of an inhibiting factor for biofilm formation.

In one aspect of the invention above, a height of the protrusion is preferably 4 µm or more. This allows the protrusion to capture suspended matters having a size of 10 µm or less. When the height of the protrusion is too low, a microscopic flow becomes less likely to be generated, and suspended-matter particles also become less likely to adhere.

In one aspect of the invention above, an average particle diameter of the solid filter material is preferably 300 µm or more to 2500 µm or less. This can realize the filter layer capable of providing an interception effect while suppressing the differential pressure of the filter layer in an initial state.

In one aspect of the invention above, the protrusion element can be made of kaolin. In one aspect of the invention above, the protrusion element can be made of iron chloride. In one aspect of the invention above, the protrusion element can be made of high-molecular polymer.

Making the protrusion element of the above-described materials makes it possible to inexpensively forma protrusion on the surface of the solid filter material. Making the protrusion element of the above-described materials realizes the filter layer that can capture suspended-matter particles having a size of 0.1 µm or more to 10 µm or less, while hardly increasing the differential pressure of the filter layer.

In one aspect of the invention above, in the step of reducing the feeding amount of the protrusion element, the feeding amount of the protrusion element is preferably reduced such that content of the protrusion element is less than 0.5 ppm as iron (Fe) in solution that passes the filter layer.

Reducing feeding of the protrusion element enables suppression of sludge generation. Whereas, even though the amount is small, continuation of the feeding of the protrusion element allows a protrusion to be additionally formed even when the protrusion is stripped off, or water quality of the water to be treated is deteriorated, and therefore the water quality of the filtrate can be stabilized.

In one aspect of the invention above, it is preferable to include a step of backwashing the filter layer by passing washing liquid through the filter layer in a direction opposite to a passing direction of the water to be treated such that the protrusion is retained on the surface of the solid filter material.

Washing the filter layer while retaining the protrusion on the surface of the solid filter material enables regeneration of the filter layer capable of capturing suspended matters with the protrusion, even after backwashing. This can provide filtrate with desired water quality after backwashing as compared with a conventional one. It is not necessary to retain 100% of the protrusion, and it is sufficient to retain the protrusion to an extent allowing filtrate with desired water quality to be obtained after backwashing.

In one aspect of the invention above, in the step of backwashing the filter layer, it is preferable to control a passing speed of the washing liquid so as to suppress a developing rate of the solid filter material to retain the protrusion on the surface of the solid filter material.

By suppressing the developing rate, movement of the solid filter material can be restrained such that the protrusion is not stripped off, and the protrusion can be retained on the surface of the solid filter material.

In one aspect of the invention above, the washing liquid is passed through the filter layer without a step of air washing that backwashes the filter layer by introducing air.

Not performing the air washing that washes the filter layer by introducing air enables washing with the movement of the solid filter material restrained. This allows the protrusion to be retained on the surface of the solid filter material.

In one aspect of the invention above, in the step of backwashing the filter layer, a developing rate of the filter layer is obtained, and the developing rate of the filter layer is made to be more than 0% to less than 30%.

Liquid washing at the developing rate being 30% or less allows the protrusion to be retained on the surface of the solid filter material, while providing a backwashing effect. A filter layer subjected to liquid washing at the developing rate being 5% or less can provide filtrate with water quality of a value equal or close to that before the backwashing, from immediately after the backwashing.

In one aspect of the invention above, it is preferable to include a step of collecting backwash filtrate generated by the backwashing, and a step of passing the backwash filtrate through the filter layer toward a passing direction of the water to be treated and reforming a protrusion on the surface of the solid filter material.

The backwash filtrate contains suspended matters that have been stripped off from the solid filter material by the backwashing, or a protrusion element and suspended matters. A suspended-matter concentration of the backwash filtrate is higher than a suspended-matter concentration of water to be treated. Collecting the backwash filtrate to pass thorough the filter layer allows a protrusion to be reformed. This can shorten a time required until stabilization of water quality of filtrate after backwashing. Since suspended matters, or a protrusion element and suspended matters are collected to be reused, an amount of the protrusion element to be newly used can be reduced, enabling suppression of treatment cost.

The present invention provides a suspended-matter removing apparatus utilizing a biofilm, including a filtering part having a filter layer formed by filling a solid filter material; a water-to-be-treated feeding part that feeds water to be treated to a first side of the filtering part to pass the water to be treated through the filter layer; a protrusion-element feeding part that feeds a protrusion element to the first side of the filtering part; a water-quality inspection part that inspects water quality of filtrate that has come out from a second side of the filtering part; a determination part that, based on a preset standard, determines whether or not a protrusion has been added to the surface of the solid filter material; and a control part that controls the protrusion-element feeding part to feed the protrusion element to the filtering part so as to add a protrusion to the surface of the solid filter material when the determination part determines that the protrusion has not been formed, and to reduce a feeding amount of the protrusion element as compared with when it is determined that the protrusion has not been formed, when the determination part determines that the protrusion has been added.

In one aspect of the invention above, the control part may also control the protrusion-element feeding part to stop feeding of the protrusion element when the determination part determines that the protrusion has been added.

In one aspect of the invention above, it is preferable to include an SBS adding part that is connected to an upstream side of the filtering part and adds sodium hydrogen sulfite to the water to be treated before being passed through the filtering part.

Advantageous Effects of Invention

A suspended-matter removing method utilizing a biofilm and a suspended-matter removing apparatus utilizing a biofilm according to the present invention perform filtration of water to be treated with a filter layer formed by filling a solid filter material added with a protrusion, thereby to inexpensively provide filtrate satisfying a water quality standard without necessity of a sludge treatment facility. The suspended-matter removing method utilizing a biofilm and the suspended-matter removing apparatus utilizing a biofilm can also provide filtrate satisfying a desired water quality standard sooner than a conventional one at starting or at restarting after operation stop, and also follow a load fluctuation of water to be treated. Moreover, according to the present invention, feeding a protrusion element enables restoration of removal performance without an increase in a differential pressure.

BRIEF DESCRIPTION OF DRAWINGS

FIG. 10 is a view showing a simulation result in Study 2.
FIG. 11 is a view showing a simulation result in Study 2.

DESCRIPTION OF EMBODIMENTS

One embodiment of a suspended-matter removing method and a suspended-matter removing apparatus according to the present invention is now described below with reference to drawings.

{First Embodiment}

Figure 1:
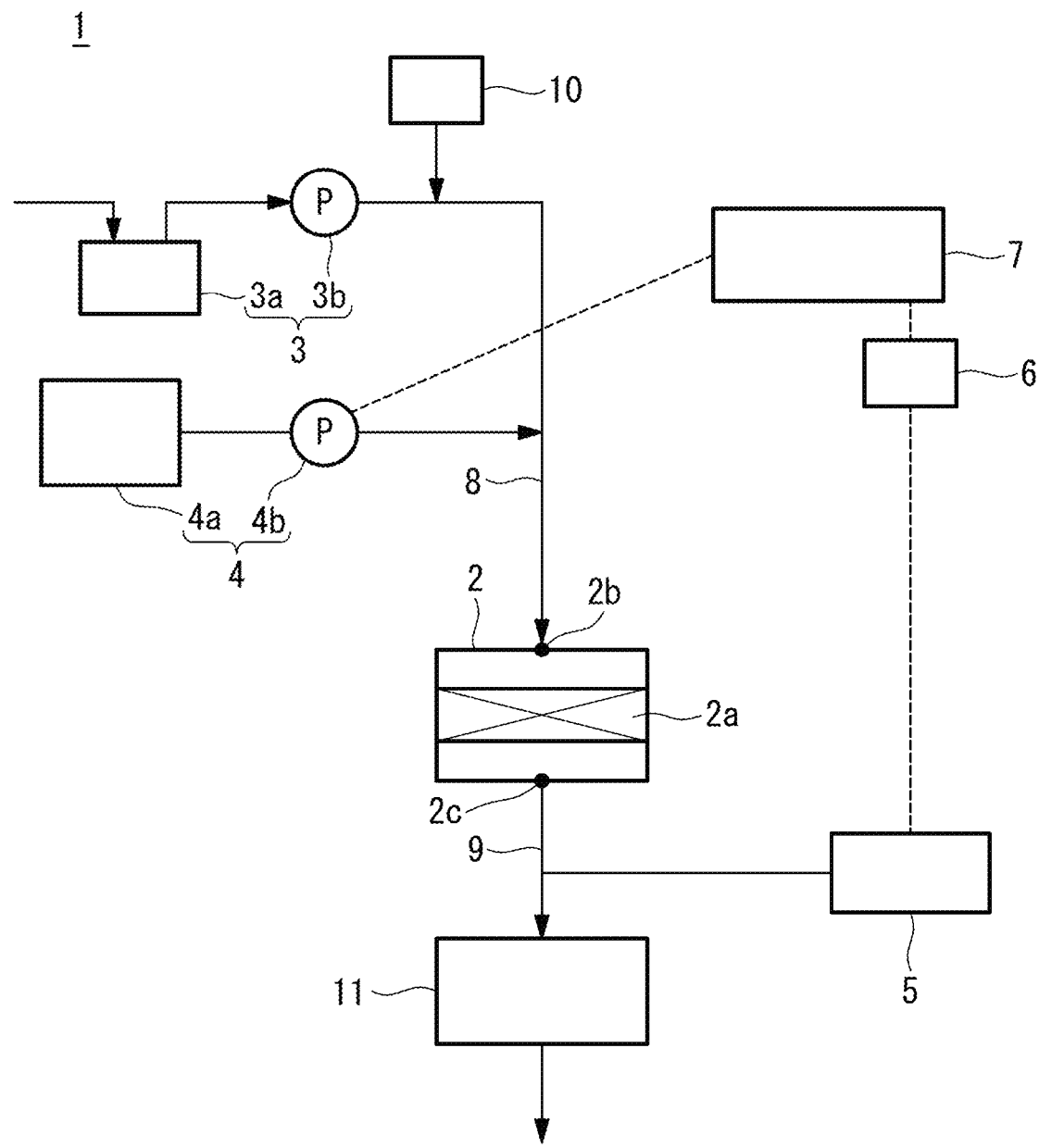
FIG. 1 is a schematic block diagram of a suspended-matter removing apparatus according to a first embodiment.

FIG. 1 is a schematic block diagram of a suspended-matter removing apparatus according to the embodiment. The suspended-matter removing apparatus 1 includes a filtering part 2, a water-to-be-treated feeding part 3, a protrusion-element feeding part 4, a water-quality inspection part 5, a determination part 6, and a protrusion-forming control part 7 (control part).

The filtering part 2 has at least one filter layer 2a, a first opening 2b provided on a first side of the filter layer 2a, and a second opening 2c provided on a second side of the filter layer. The first opening 2b and the second opening 2c are inflow/outflow ports for liquid, of the filtering part 2. The first opening 2b is connected with a first passage 7. The second opening 2c is connected with a second passage 8.

The filter layer 2a is formed by filling a solid filter material in the filtering part. A filling rate of the solid filter material is appropriately set. One filter layer 2a is formed by a solid filter material made of one kind of material. A plurality of the filter layers 2a may be laminated in the filtering part. For example, a sand filter layer filled with sand and a crushed-carbon filter layer formed by filling crushed carbon may be laminated, solid filter materials made of different materials have different surface conditions. Combination of filter layers formed by different materials enables removal of suspended-matters with a wide range of sizes.

A solid filter material to be used is granular or fibrous. For example, the solid filter material is made of sand, anthracite, crushed activated carbon, fiber bundle, and the like. Since crushed activated carbon has an effect of removing chlorine, using crushed activated carbon as the solid filter material enables removal of chlorine contained in water to be treated, in the filtering part. This can prevent deterioration in an RO membrane, even when the RO membrane is provided at a subsequent stage.

An average particle diameter of the solid filter material is selected from 300 μm or more to 2500 μm or less. A definition of "the average particle diameter of the solid filter material" is based on AWWA B100-01 and JIS8801.

The water-co-be-treated feeding part 3 can feed water to be treated to the first side of the filtering part 2, to pass the water to be treated through the filter layer 2a. in this embodiment, the water-to-be-treated feeding part 3 is configured by a water-to-be-treated tank 3a and a first feeding means 3b. The water-to-be-treated feeding part 3 is connected to the first opening 2b of the filtering part 2 via the first passage 7. The water-to-be-treated tank 3a is a container that stores the water to be treated. The stored water to be treated is seawater, dirty water, industrial wastewater, or the like. The first feeding means 3b is a pump or the like. The first feeding means 3b can feed the water to be treated stored in the water-to-be-treated tank 3a, to filtering part 2 via the first passage 7.

The protrusion-element feeding part 4 can feed a protrusion element to the first side of the filtering part 2. In this embodiment, the protrusion-element feeding part 4 is configured by a protrusion element tank 4a and a second feeding means 4b. The protrusion-element feeding part 4 is connected to the first opening 2b of the filtering part 2 via the first passage 7, at a downstream side of the water-to-be-treated feeding part 3. The protrusion element tank 4a is a container that stores the protrusion element. The second feeding means 4b is a pump or the like. The second feeding means 4b can feed the protrusion element stored in the protrusion element tank 4a, to the filtering part 2 via the first passage 7.

The protrusion element is made of iron chloride, iron sulfate, polyaluminum chloride (PAC), aluminum sulfate, mineral, high-molecular polymer (cationic high-molecular polymer, anionic high-molecular polymer, and nonionic high-molecular polymer), inorganic pigment, and the like. The mineral is, for example, kaolin. For the cationic high-molecular polymer, polyacrylic ester-based, polymethacrylic acid ester-based, and polyacrylamide-based are suitable. As the anionic high-molecular polymer, polyacrylamide-based and polyacrylic acid-based are preferable. As the nonionic high-molecular polymer, polyacrylic ester-based, polymethacrylic acid ester-based, and polyacrylamide-based are preferable. The inorganic pigment is, for example, calcium carbonate, talc, and titanium oxide. The protrusion element may be powder or liquid. In this embodiment, the protrusion element is stored in the protrusion element tank in a solution state prepared at a predetermined concentration (protrusion forming liquid).

For example, iron chloride becomes iron hydroxide in the water, and a microfloc of the iron hydroxide adheres to the surface of the solid filter material, to form a protrusion. The microfloc may involve minute particles in the water. For example, kaolin physically adheres to the surface of the solid filter material, to form a protrusion. For example, high-molecular polymer acts as an adhesive for bonding particles contained in the water to the solid filter material, and adheres to the surface of the solid filter material along with the particles, to form a protrusion.

The protrusion element that is fed to the filter layer may be one or more kinds. For example, when kaolin and high-molecular polymer are fed to the filter layer, the kaolin physically adheres to the surface of the solid filter material, and particles contained in the water and the kaolin adhere to the surface of the solid filter material through an adhesive effect of the high-molecular polymer, to form a protrusion.

The water-quality inspection part 5 inspects water quality of filtrate that has come out from the second side of the filtering part. The water-quality inspection part 5 is, for example, an SDI (Silt Density index) measuring device, a turbidimeter, a TOC meter, an SS meter, a UV meter, a COD meter, and the like. In FIG. 1, the water-quality inspection part 5 is connected to the second passage 9 and the determination part 6. The water-quality inspection part 5 can inspect the water quality of the filtrate discharged from the filtering part 2 to the second passage 9, and output an inspection result to the determination part 6.

The determination part 6 can determine, based on a preset standard, whether or not a protrusion has been added to a surface of a solid filter material. In this embodiment, the "standard" is a threshold value provided for an inspection value that is obtained by the water-quality inspection part 5. The determination part 6 can determine that a protrusion satisfying a preset standard has not been added (hereinafter abbreviated as a protrusion has not been added) when the inspection value obtained from the water-quality inspection part 5 exceeds a preset threshold value, and determine that the protrusion satisfying the preset standard has been added (hereinafter abbreviated as a protrusion has been added) when the Inspection value becomes equal to or less than the threshold value. The threshold value is appropriately set in accordance with an item of water quality to be inspected. The determination part 6 may be incorporated into the protrusion-forming control part 7.

It should be noted that, in this embodiment, the determination part 6 may include a counting means (not shown) that counts a total feeding amount of the protrusion element. For example, the counting means is connected to a second feeding means 4b. For example, the counting means can receive a power-supply ON/OFF signal of the second feeding means 4b, and count a total feeding amount of the protrusion element based on a time when the power supply of the second feeding means 4b is ON, and a concentration of the protrusion element in the protrusion forming liquid. The determination part 6 can determine that, when the counted total feeding amount of the protrusion element reaches a preset threshold value, a standard amount of the protrusion has been added to the surface of the solid filter material. The determination part 6 may be incorporated into the second feeding means 4b or the protrusion-forming control part 7. When the determination part 6 includes the counting means, the determination part 6 is configured capable of determining whether or not a protrusion has been added based on information of at least either the counting means or the water-quality inspection part 5.

The protrusion-forming control part 7 can control a feeding amount of the protrusion element from the protrusion-element feeding part 4 such that the protrusion element is fed so as to add a protrusion to the surface of the solid filter material when the determination part 6 determines that the protrusion has not been formed, and the feeding amount of the protrusion element is reduced when it is determined the protrusion has been added. The feeding amount of the protrusion element required for adding a protrusion to the surface of the solid filter material has been appropriately set in accordance with a kind of the protrusion element. "Reduce the feeding amount of the protrusion element" means decreasing the feeding amount of the protrusion element as compared with when adding the protrusion.

When protrusion elements, such as iron chloride and high-molecular polymer, capable of providing a flocculation effect are used, the feeding amount of the protrusion element is set to be reduced to an amount with which at least a flocculation effect cannot be expected. "Reduce the feeding amount of the protrusion element" includes stopping of the feeding amount of the protrusion element.

The suspended-matter removing apparatus 1 preferably includes an SBS adding part 10 that adds sodium hydrogen sulfite (SBS) to water to be treated on an upstream side of the filtering part 2. The SBS adding part 10 is connected to the first passage 8 that is on an upstream side of the filtering part 2. Water to be treated, such as seawater or treated waste water, contains an oxidizing agent such as a hypochlorous acid. Such an oxidizing agent sterilizes microorganisms, which causes delay in biofilm formation. The SBS adding part prevents delay in biofilm formation by adding SBS to the water to be treated to neutralize the oxidizing agent.

The suspended-matter removing apparatus 1 may include, at a downstream side of the filtering part 2, a reverse-osmosis-membrane treatment part 11, an electrodialysis part (not shown), an evaporator (not shown) or the like. The reverse-osmosis-membrane treatment part 11 is, for example, a reverse-osmosis-membrane treatment apparatus having a plurality of reverse-osmosis-membrane elements in a container. The reverse-osmosis-membrane treatment apparatus can divide the water to be treated (filtrate) that has passed through the filtering part 2, into fresh water and concentrated water containing ions, salt or the like, with a reverse osmosis membrane (RO membrane).

Figure 2:
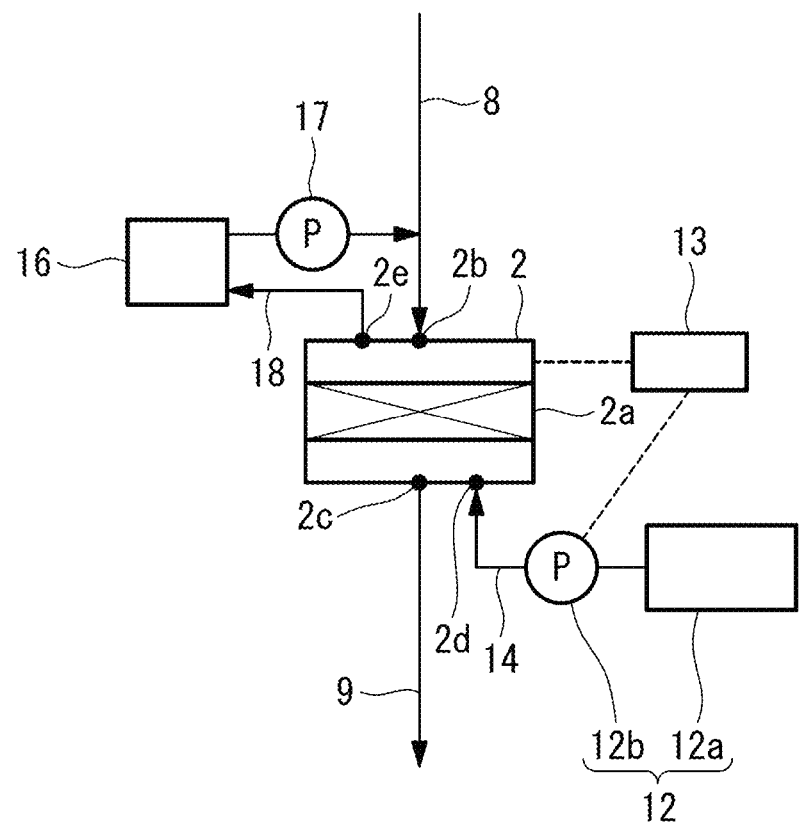
FIG. 2 is a diagram explaining a backwashing means.

The suspended-matter removing apparatus 1 preferably includes a backwashing means for backwashing the filter layer 2a, as shown in FIG. 2. FIG. 2 is a diagram for explaining a configuration of the backwashing means. The backwashing means includes a washing-liquid feeding part 12 and a backwashing control part 13. The filtering part 2 has a third opening 2d and a fourth opening 2e. The fourth opening 2e is provided on the first side of the filter layer 2a. The third opening 2d is provided on the second side of the filter layer. The third opening 2d and the fourth opening 2e are inflow/outflow ports for washing liquid. The third opening 2d is connected with a third passage 14. The fourth opening 2e is connected with a fourth passage 18.

The washing-liquid feeding part 12 can feed washing liquid to the second side of the filtering part 2, to pass the washing liquid through the filter layer 2a in a direction opposite to the passing direction of the water to be treated. In FIG. 2, the washing-liquid feeding part 12 is configured by a washing-liquid tank 12a and a third feeding means 12b.

The washing-liquid feeding part 12 is connected to the third opening 2d via the third passage 14. The washing-liquid tank 12a is a container that stores washing liquid. The stored washing liquid is seawater (water to be treated) or primarily treated water that has passed the filter layer 2a. When an RO desalination apparatus or an electrodialyzer is provided at a subsequent stage of the filtering part 2, the stored washing liquid is concentrated water (brine) that has been separated at the filter layer 2a, or the like. The third feeding means 12b is a pump capable of adjusting a feeding speed, or the like. The third feeding means 12b can feed the washing liquid stored in the washing-liquid tank 12a to the filtering part 2 via the third passage 14.

The backwashing control part 13 controls a passing speed of the washing liquid so as to suppress a developing rate of a solid filter material to retain a protrusion on the surface of the solid filter material. This passing speed provides a desired backwashing effect.

"The protrusion is retained on the surface of the solid filter material" is not limited to that all the protrusions are retained on the surface of the solid filter material. When a preset standard amount of the protrusion can be retained, the filter layer after backwashing can provide suspended-matter removal performance equal to that before backwashing. When a part of the protrusion is retained, the filter layer after backwashing can provide suspended-matter removal performance higher than that of the filter layer completely stripped of the protrusion. An amount of the protrusion that should be retained (standard amount) is confirmed through a preliminary test or the like in advance. It is preferable to retain the protrusion to an extent allowing an SDI of filtrate that has come out from the filter layer after backwashing to be a value equal or close to an SDI of filtrate that has come out from the filter layer before backwashing.

The "desired washing effect" means that a differential pressure of the filter layer has returned to an initial differential pressure when the water to be treated is passed through the filter layer after backwashing. Whether the desired washing effect can be obtained or not by passing the washing liquid at the passing speed above is confirmed through a preliminary test or the like in advance.

In FIG. 2, the backwashing control part 13 can obtain a developing rate of the filter layer, and control a passing speed of the washing liquid such that the developing rate becomes equal to or less than a predetermined developing rate. The developing rate can be calculated from an experimental formula based on a particle diameter of sand, density of sand, water temperature, or the like. The developing rate may be obtained by a sensor capable of detecting movement of the solid filter material, provided inside the filtering part. The "developing rate" is a ratio of a moving distance to a length of the filter layer when the solid filter material receives a flow of the washing liquid to move in the flow direction of the washing liquid. When a length of the filter layer before the passing the washing liquid is $L_1$, and a length of the filter layer in passing of the washing liquid is $L_2$, the developing rate can be calculated from the formula $(L_2-L_1)/L_1 \times 100$. In order to suppress energy consumption of power, it is preferable that the developing rate is more than 0% to less than 30%, preferably more than 0% to 5% or less.

The backwashing means preferably includes the collecting part 16 and the protrusion-reforming part 17.

The collecting part 16 can collect and store backwash filtrate (washing liquid that has passed the filter layer) generated by backwashing. The collecting part 16 is connected to the fourth opening 2e via the fourth passage 18.

The protrusion-reforming part 17 can pass the collected backwash filtrate through the filter layer toward a passing direction of the water to be treated. The protrusion-reforming part 17 is, for example, a pump connected to the collecting part 16. The protrusion-reforming part 17 is connected to the first opening 2b of the filtering part 2 via the first passage 8.

After backwashing, when the protrusion is stripped off and suspended-matter removal performance of the filter layer is degraded, the protrusion element needs to be fed to form a protrusion on the surface of the solid filter material. The backwash filtrate contains the protrusion element of the protrusion that has been stripped off by backwashing. Passing this backwash filtrate through the filter layer allows the protrusion element to adhere again to the surface of the solid filter material to reform a protrusion. By utilizing backwashing liquid for reforming the protrusion, necessity of further addition of the protrusion element can be eliminated, or an amount of the protrusion element to be further added can be reduced. This can suppress processing cost.

The protrusion-forming control part 7 and backwashing control part 13 are, for example, configured by a CPU (Central Processing Unit), a RAM (Random Access Memory), a ROM (Read Only Memory), a computer-readable storage medium, and the like. Then, a series of processing for achieving various functions is, as an example, stored in a form of a program in a storage medium or the like, and the CPU reads the program into the RAM or the like to execute information processing and arithmetic processing, thereby to achieve the various functions. It should be noted that, the program may be applied with a form such as a form that is previously installed in a ROM or another storage medium, a form provided in a state being stored in a computer-readable storage medium, or a form that is delivered via a wired or wireless communication means. The computer-readable storage medium is a magnetic disk, a magneto-optical disk, a CD-ROM, a DVD-ROM, a semiconductor memory, or the like.

Next, a suspended-matter removing method according to the embodiment is described. The suspended-matter removing method according to the embodiment includes the following steps (S1) to (S6):
(S1) A step of adding a protrusion
(S2) A step of determining whether or not a protrusion has been added
(S3) A step of reducing a feeding amount of the protrusion element as compared with when adding a protrusion
(S4) A step of passing water to be treated containing suspended matters, through the filter layer having a solid filter material formed with the protrusion
(S5) A step of forming a biofilm
(S6) A step of backwashing the filter layer In the step of adding a protrusion (S1), a protrusion element is fed to the filter layer 2a, to add a protrusion to the surface of the solid filter material.

The protrusion element is made of iron chloride, iron sulfate, polyaluminum chloride (PAC), aluminum sulfate, mineral, high-molecular polymer (cationic high-molecular polymer, anionic high-molecular polymer, and nonionic high-molecular polymer), inorganic pigment, and the like. The mineral is, for example, kaolin. For the cationic high-molecular polymer, polyacrylic ester-based, polymethacrylic acid ester-based, and polyacrylamide-based are suitable. As the anionic high-molecular polymer, polyacrylamide-based and polyacrylic acid-based are preferable. As the nonionic high-molecular polymer, polyacrylic ester-based, polymethacrylic acid ester-based, and polyacrylamide-based are preferable. The inorganic pigment is, for example, calcium carbonate, talc, and titanium oxide.

The protrusion element adheres to the surface of the solid filter material to form a protrusion itself, or bonds particles in water to the solid filter material. For example, iron chloride becomes iron hydroxide in the water, and a microfloc of the iron hydroxide adheres to the surface of the solid filter material, to form a protrusion. The microfloc may involve minute particles in the water. For example, kaolin physically adheres to the surface of the solid filter material, to form a protrusion. For example, high-molecular polymer acts as an adhesive for bonding particles contained in the water to the solid filter material, and adheres to the surface of the solid filter material along with the particles, to form a protrusion.

The protrusion element that is fed to the filter layer may be one or more kinds. For example, when kaolin and high-molecular polymer are fed to the filter layer, the kaolin physically adheres to the surface of the solid filter material, and particles contained in the water and the kaolin adhere to the surface of the solid filter material through an adhesive effect of the high-molecular polymer, to form a protrusion.

The protrusion element may be powder or suspension containing minute particles. In this embodiment, the protrusion element is fed in a solution state containing the protrusion element (protrusion forming liquid). A solvent of the protrusion forming liquid is industrial water, seawater, clear water or the like. When the protrusion element is made of high-molecular polymer, the protrusion forming liquid is preferably prepared with solution containing particles (e.g. seawater).

A concentration of the protrusion element in the protrusion forming liquid is set such that a predetermined amount of the protrusion element is fed when the protrusion forming liquid is passed through the filter layer 2a. The feeding amount of the protrusion element may be appropriately set in accordance with a kind of the protrusion element and a component of the water to be treated.

A protrusion is added by passing the protrusion forming liquid through from the first side to the second side of the filter layer 2a. This allows a protrusion to be added to the surface of the solid filter material. A filtering speed of the protrusion forming liquid is preferably same as a filtering speed of the water to be treated. The filtering speed can be adjusted by the first feeding means 3b or the second feeding means 4b. when the filtering speed is adjusted by the first feeding means 3b, the water to be treated is passed through the filter layer 2a, in parallel with the step of adding a protrusion (S1).

Next, it is determined whether or not a protrusion has been added to the surface of the solid filter material (S2). Based on a preset standard, it is determined whether or not a protrusion has been added to the surface of the solid filter material. In this embodiment, water quality of filtrate that has come out from the filter layer 2a is inspected, and it is determined whether or not a protrusion satisfying a preset standard has been added based on the obtained inspection value. These are hereinafter abbreviated as a protrusion has been added, and a protrusion has not been added.

Water-quality inspection is performed with an SDI measuring device, a turbidimeter, a TOC meter, an SS meter, a UV meter, a COD meter and the like. The threshold value is set in accordance with an inspection method. For example, when the inspection method is an SDI, the threshold value may be SDI<4 or the like.

When the inspection value of the filtrate is equal to or less than a preset threshold value, it is determined that a protrusion has been added to the surface of the solid filter material, and a feeding amount of the protrusion element is reduced as compared with when the protrusion is added (S3). The extent of the reduction of the feeding amount of the protrusion element may be appropriately set in accordance with a kind of the protrusion element. When there is used a protrusion element that can provide a flocculation effect in accordance with a feeding amount, the feeding amount of the protrusion element after being reduced is an amount of a degree in which the flocculation effect cannot be expected even if added to the water to be treated. For example, when the protrusion element is made of iron chloride, it is reduced to about less than 0.5 ppm as iron (Fe) with respect to an amount of solution to be passed through the filter layer 2a. In the step (S3), the feeding amount of the protrusion element may be set to be zero, by stopping the feeding of the protrusion element.

Water to be treated containing suspended matters is passed through the filter layer 2a (S3), with the feeding amount of the protrusion element reduced (or stopped). Here, a protrusion has been added to the surface of the solid filter material filled in the filter layer 2a.

In the step of forming a biofilm (S5), solution containing microorganisms is fed to the filter layer 2a. Passing the solution containing microorganisms from the first side to the second side of the filter layer 2a causes a biofilm to be formed on the surface of the solid filter material. If the water to be treated contains microorganisms, the water to be treated may be fed to the filter layer 2a. In this case, a period while the water to be treated is being passed through the filter layer 2a is equivalent to performing the step of forming a biofilm (S5). When the water to be treated is passed through the filter layer 2a, suspended matters contained in the water to be treated may adhere to a protrusion to form an effective protrusion themselves.

When water to be treated contains chlorine (Cl), it is preferable to add SBS to the water to be treated, and then pass through the filter layer 2a. An addition amount of the SBS is determined depending on the residual chlorine. The SBS is preferably added such that oxidation-reduction potential (ORP) becomes a predetermined value. For example, the SBS is added such that the ORP becomes 200 mV or less. This can eliminate an inhibiting factor for biofilm formation.

In this embodiment, the step of adding a protrusion (S1) can be performed in an initial step of suspended-matter removal, or when a protrusion once added to the surface of the solid filter material is stripped off during treatment, or when a component of the water to be treated fluctuates and water Quality of the filtrate is degraded. The water quality is continuously inspected during passing of solution, such as a protrusion element or water to be treated, through the filter layer 2a.

When an inspection value of the filtrate exceeds a preset threshold value, it is determined that a protrusion has not been formed on the surface of the solid filter material, and the protrusion element in an amount to add a protrusion is fed to the filter layer 2a. When the inspection value of the filtrate is equal to or less than a preset threshold value, it is determined that a protrusion has been added to the surface of the solid filter material, and a feeding amount of the protrusion element is reduced as compared with when the protrusion is added.

When the protrusion element is fed to the filter layer filled with the solid filter material, the protrusion element comes into contact with the solid filter material to add a protrusion to the surface of the solid filter material. At a removal of suspended matters from the water to be treated, passing the protrusion element through the filter layer at an early stage allows the protrusion to be added to the surface of the solid filter material in a short time.

The filter layer formed by filling the solid filter material added with the protrusion can stably remove suspended matters at a high removal rate from an initial stage of the step of removing suspended matters from the water to be treated. This can shorten a starting time of the suspended-matter removing apparatus as compared with conventional ones. Additionally, since the filter layer filled with the solid filter material added with the protrusion can capture suspended matters of 0.1 µm or more to 10 µm or less, it is possible to improve the water quality of the filtrate even when the water to be treated includes many suspended matters having a size of 0.1 µm or more to 10 µm or less. Namely, it makes it possible to cope with fluctuation in water quality of the water to be treated. Adding a protrusion to the surface of the solid filter material of 300 µm or more to 2500 µm or less provides a suspended-matter removal effect more than an interception effect.

Reducing the feeding amount of the protrusion element enables suppression of sludge generation. This suppresses an increase in a differential pressure in the filter layer, which can prolong a backwashing interval and eliminate necessity of a sludge treatment facility.

Even when the feeding of the protrusion element is stopped, water quality of the filtrate in the step (S3) can be stabilized until the protrusion is stripped off, as long as the protrusion has once been added to the surface of the solid filter material. The protrusion can be replenished by continuing the feeding of the protrusion element, even though the amount is small. Therefore, even if the protrusion is stripped off, stability of the water quality of the filtrate can be maintained. Moreover, when the feeding of the protrusion element is stopped, an amount of protrusion-element usage can be lowered, enabling reduction of treatment cost.

Figure 3:
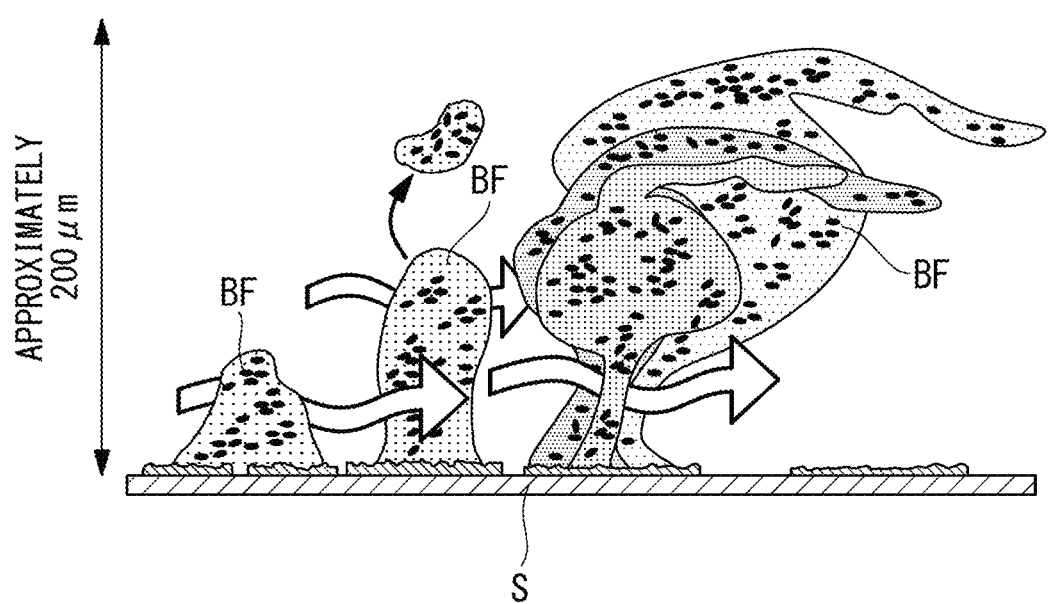
FIG. 3 is a schematic view explaining a biofilm.

Feeding solution containing microorganisms (e.g., seawater) to the filter layer causes the microorganisms to adhere to the solid filter material S to form a biofilm bf on the surface of the solid filter material. As the solution containing microorganisms continuously flows, the biofilm BF grows around the previously-formed biofilm BF as a core. Since the biofilm BF grows while securing a passage F of the water to be treated such that oxygen and nutrition are supplied to the previously-formed biofilm BF, the protrusion is presumed to be as shown in FIG. 3 (see Costerton, J. W.; Lewandowski, Z.; Caldwell, D. E.; Korbor, D. R.; Lappin-Scott, H. M. "Microbial Biofilms", Annual Reviews of Microbiology 49, pp. 721-745 (1995)).

The protrusion element, in this embodiment, is derived from other than microorganisms. Feeding the protrusion element allows a protrusion to be added to the surface of the solid filter material in a short time, earlier than forming the biofilm. It is considered that feeding of solution containing microorganisms to such a solid filter material causes microorganisms to adhere to a protrusion to form the biofilm, and grow around the protrusion as a core. The biofilm that has adhered to the protrusion becomes a part of the protrusion itself. As the protrusion becomes larger, the protrusion can be easily adhered by suspended matters having a size of 0.1 µm or more to 10 µm or less. In this embodiment, since the protrusion can be made larger by forming the biofilm even after the feeding amount of the protrusion element is reduced, the water quality of the filtrate can be stabilized for a longer time.

Since the water quality of the filtrate is inspected during passing of the water to be treated, a protrusion can be added again to the surface of the solid filter material when the water quality of the filtrate is degraded. The water quality of the filtrate can be more stable since it is possible to adjust an amount of the protrusion to be added so as to provide a desired water quality when the protrusion is stripped off to degrade suspended-matter removal performance, or when an amount of suspended matters contained in the water to be treated is increased.

Although, in the step of adding a protrusion (S1) in the embodiment, a protrusion is added after the solid filter material fills the filtering part, a similar effect can be obtained by forming the filter layer by filling the filtering part with the solid filter material, that has been added with a protrusion in another container.

After a predetermined time of operation, or when a differential pressure of the filter layer exceeds a certain value, or the like, the step of backwashing the filter layer (S6) is performed.

In the step of backwashing the filter layer (S6), washing liquid is passed through the filter layer in a direction opposite to a passing direction of the water to be treated. At this time, the washing liquid is fed to the second side of the filter layer such that the protrusion is retained on the surface of the solid filter material. The washing liquid is passed at a speed that can provide a desired washing effect and can suppress a developing rate of the solid filter material.

The step of backwashing (S6) is performed only by washing liquid, while air washing that washes the filter layer by introducing air is not performed. The air washing is a washing method that makes larger movement of the solid filter material than that of backwashing using washing liquid, and mixes the solid filter material in the filter layer. Not performing the air washing enables suppression of the movement of the solid filter material.

In the step of backwashing the filter layer (S6), for example, it is preferable to obtain the developing rate of the filter layer and perform control such that the washing liquid is passed at a speed at which the developing rate of the filter layer becomes more than 0% to less than 30%, preferably more than 0% to 5% or less.

By performing backwashing such that the protrusion is retained on the surface of the solid filter material to regenerate the filter layer, the filtrate satisfying a desired water quality standard can be stably obtained from immediately after the backwashing.

It is more preferable that the step of backwashing the filter layer (S6) is performed such that the biofilm formed in (S5) above is retained. As regards "a biofilm is retained", it is not necessary to retain all the biofilms, and it is sufficient to retain the biofilm that constitutes the protrusion satisfying a preset standard. For example, it is sufficient to retain a biofilm having a size such as that shown on the left side of the figure in FIG. 3, while a biofilm of about 200 µm on the right-most side of the figure in FIG. 3 may be stripped off without being retained.

{Second Embodiment}

Figure 4:
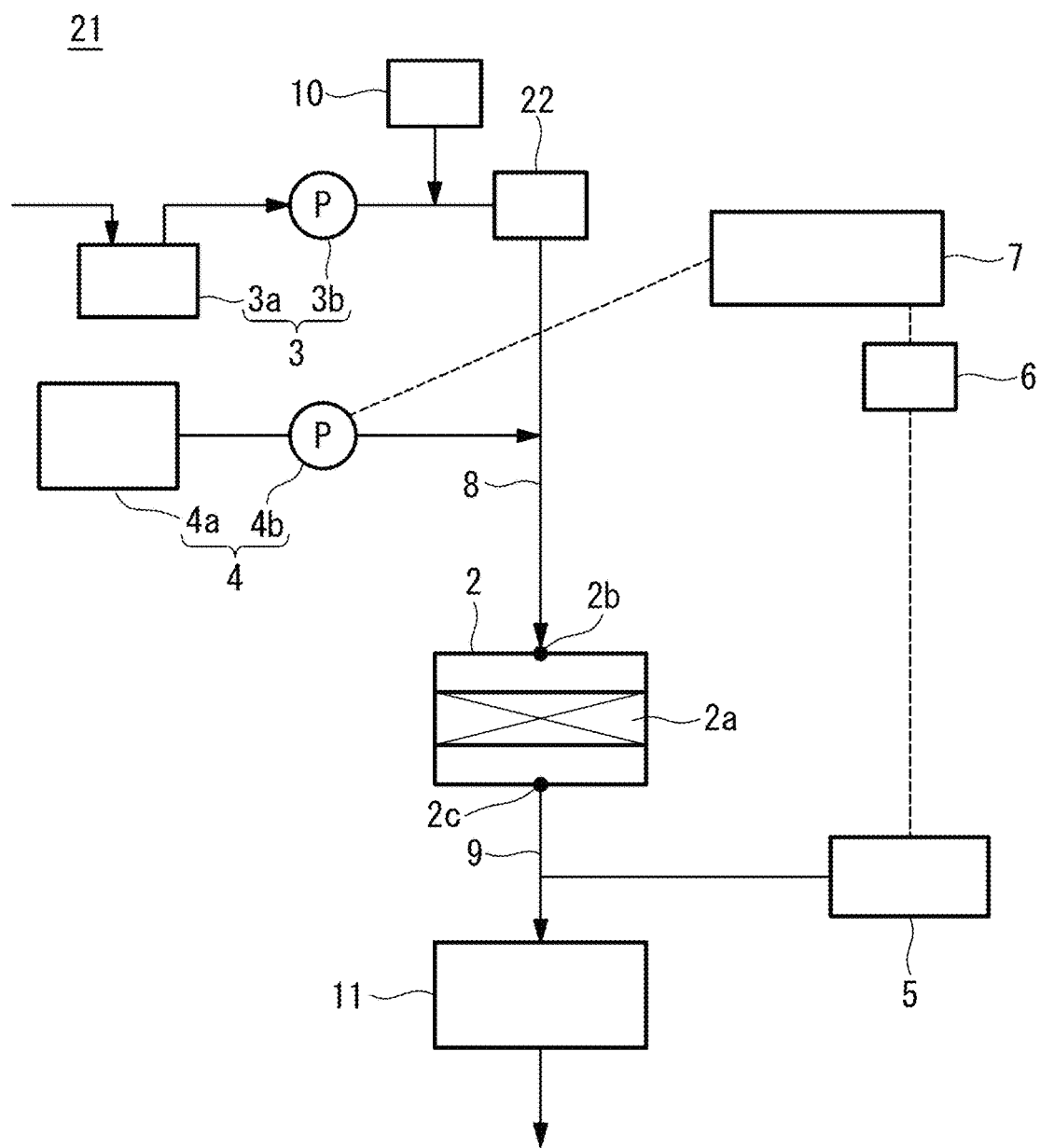
FIG. 4 is a schematic block diagram of a suspended-matter removing apparatus according to Modified Example or a second embodiment.

FIG. 4 is a schematic block diagram of a suspended-matter removing apparatus 21. The suspended-matter removing apparatus 21 has a same configuration as that of the first embodiment except for including a coarse-particle separation part 22.

The coarse-particle separation part 22 is provided between a water-to-be-treated feeding part 3 and a filtering part 2, in a preceding stage of a protrusion-element feeding part 4. The coarse-particle separation part 22 mainly separates suspended matters larger than 10 µm contained in water to be treated. The coarse-particle separation part 22 is a sand filtration apparatus, a floatation-separation apparatus, or the like. When the coarse-particle separation part 22 is a sand filtration apparatus, the water to be treated may be passed without addition of a flocculant. When the coarse-particle separation part 22 is a floatation-separation apparatus, solid-liquid separation is performed by bonding/floating SS (sludge or floating matter) with a large amount of bubbles (micro-air) generated from water to be treated mixed with saturated pressurized water.

In this embodiment, by passing water to be treated through the coarse-particle separation part 22, suspended matters larger than 10 µm is mainly separated from the water to be treated, to make it primarily treated water. Then, the primarily treated water is guided to the filter layer, and suspended matters having a size of 0.1 µm or more to 10 µm or less are removed.

The protrusion element can be fed to the filter layer 2a, at a same time as guiding the primarily treated water to the filter layer. The protrusion element may be fed to the filter layer 2a before guiding the primarily treated water to the filter layer 2a. In either case, a protrusion is added to the surface of the solid filter material in accordance with the first embodiment, and then the feeding amount of the protrusion element is reduced (or stopped).

According to the embodiment, by separating the rough removal of suspended matters with a large particle diameter in the water to be treated, and the removal of suspended matters with a medium particle diameter of 0.1 µm or more to 10 µm or less, an increase in a differential pressure due to clogging or the like in the filter layer can be suppressed. This makes it possible to stabilize the water quality of the filtrate of the filter layer, and reduce a backwashing frequency of the filter layer.

{Third Embodiment}

Figure 5:
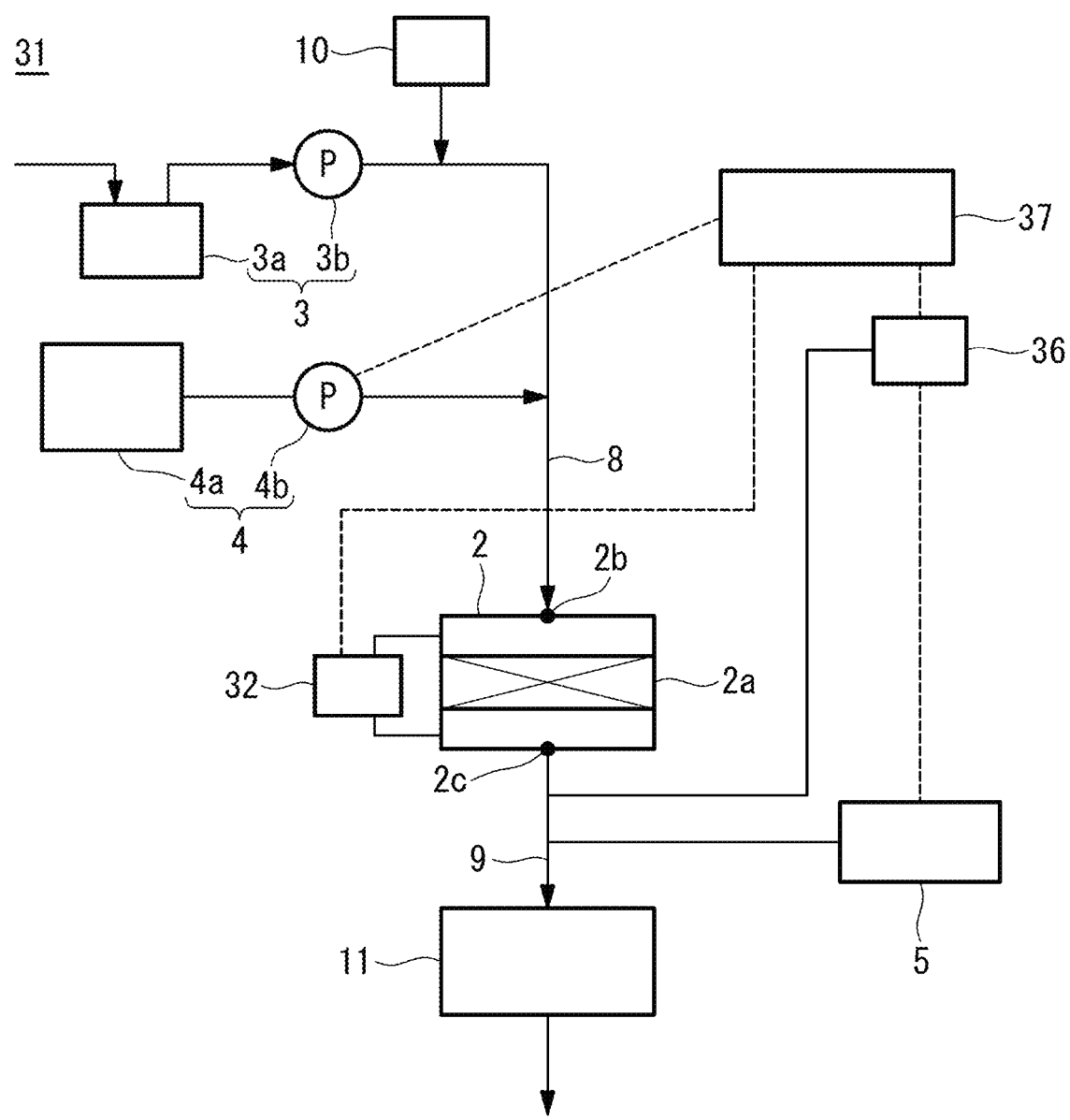
FIG. 5 is a schematic block diagram of a suspended-matter removing apparatus according to Modified Example of a third embodiment.

The third embodiment is different from the first embodiment in that the suspended-matter removing apparatus includes a differential-pressure measurement part. Same reference numerals are given to configurations that are identical to those in the first embodiment, and description thereof is omitted FIG. 5 is a schematic block diagram of a suspended-matter removing apparatus according to the embodiment. The suspended-matter removing apparatus 31 includes a filtering part 2 (filtration apparatus), a water-to-be-treated feeding part 3, a protrusion-element feeding part 4, a water-quality inspection part 5, a determination part 36, a protrusion-forming control part 37, and a differential-pressure measurement part 32.

The differential-pressure measurement part 32 can measure a differential pressure between a first side (first opening side) and a second side (second opening side) of a filter layer 2a (the filtering part 2). In this embodiment, the differential-pressure measurement part 32 is connected to the first side and the second side of the filtering part 2. The differential-pressure measurement part 32 is, for example, a water pressure meter. The water pressure meter detects pressures on the first side and the second side of the filtering part 2, to measure the differential pressure.

The determination part 36 can determine, based on a preset standard, whether or not a protrusion has been added to a surface of a solid filter material. In this embodiment, the determination part 36 includes a protrusion-element-amount measurement means (not shown) that directly or indirectly measures an amount of the protrusion element contained in the filtrate that has come out from the second side (second opening side) of the filtering part 2. The protrusion-element-amount measurement means may be sufficient if it can directly or indirectly measure the amount of the protrusion element. For example, when the protrusion element is made of iron chloride, a water-quality analyzer capable of monitoring an iron concentration can be used as the protrusion-element-amount measurement means, to directly measure the protrusion element. For example, using an SDI measuring device as the protrusion-element-amount measurement means enables indirect measurement of the protrusion element. For example, when the protrusion element is made of kaolin, using a turbidimeter as the protrusion-element-amount measurement means enables indirect measurement of the protrusion element.

When the protrusion element is indirectly measured, the protrusion-element-amount measurement means can also serve as the water-quality inspection means. In this embodiment, the protrusion-element-amount measurement means is an SDI measuring device, which also serves as the water-quality inspection means.

The determination part 36 can determine that a protrusion that satisfies a preset standard has been added to the surface of the solid filter material, when a measured value of the protrusion-element-amount measurement means becomes equal to or less than a preset threshold value. The determination part 36 may also determine that a protrusion that satisfies a preset standard has been added to the surface of the solid filter material, when it is confirmed that the measured value becomes equal to or less than a preset threshold value and has been maintained in the state for a certain time. The determination part 36 may be incorporated into the protrusion-forming control part 37.

The protrusion-forming control part 37 is connected to the differential-pressure measurement part 32, the determination part 36, and a second feeding means 4b. The protrusion-forming control part 37 can control a feeding amount of the protrusion element from the protrusion-element feeding part 4 such that the differential pressure measured by the differential-pressure measurement part 32 becomes less than a predetermined value. The protrusion-forming control part 37 receives a differential pressure value measured by the differential-pressure measurement part 32, and automatically controls the feeding amount of the protrusion element from the protrusion-element feeding part 4 such that the differential pressure is maintained at less than the predetermined value.

The protrusion-forming control part 37 can control the protrusion-element feeding part 4 to feed the protrusion element to add a protrusion to the surface of the solid filter material when the determination part 36 determines that a protrusion has not been added, and to reduce the feeding amount of the protrusion element when the determination part 36 determines that a protrusion has been added.

The water treatment apparatus 31 may include, at a downstream side of the filtering part 2, a reverse-osmosis-membrane treatment part 11, an eleotrodialysis part (not shown), an evaporator (not shown) or the like. The water treatment apparatus 31 may include a backwashing means (not shown) for backwashing the filter layer 2a.

The suspended-matter removing method according to the embodiment includes the following steps (S11) to (S16):
(S11) A step of adding a protrusion
(S12) A step of measuring a differential pressure between a first side of a filter layer and a second side of the filter layer
(S13) A step of reducing a feeding amount of the protrusion element as compared with when adding a protrusion (S14) A step of passing water to be treated containing suspended matters, through the filter layer having a solid filter material added with the protrusion
(S15) A step of forming a biofilm
(S16) A step of backwashing the filter layer In the step of adding a protrusion (S11), the protrusion element is fed to the filter layer 2a to add a protrusion to the surface of the solid filter material. A procedure for feeding the protrusion element to the filter layer 2a is same as that of the first embodiment.

In this embodiment, while the protrusion element is being fed to the filter layer 2a, the differential pressure between the first side and the second side of the filter layer 2a is measured (S12). In the step of adding a protrusion (S11), the protrusion element is fed to the filter layer 2a in a range that the differential pressure measured at (S12) is less than a predetermined value. When the measured differential pressure becomes equal to or more than the predetermined value, the feeding of the protrusion element is immediately stopped. The "predetermined value" may be set based on an allowable pressure of the filtering part, or may previously be set by performing a preliminary test or the like. In the preliminary test, the differential pressure of the filter layer is measured, and water quality of filtrate is inspected, for example, by passing the protrusion forming liquid containing the protrusion element with an optional concentration through the filter layer. The differential pressure of the filter layer when an inspection value of the filtrate becomes a desired value may be set to be a predetermined value.

In the step (S13), an amount of the protrusion element contained in the filtrate that has come out from the filter layer 2a in the step of adding a protrusion (S11), is directly or indirectly measured. When the measured amount of the protrusion element becomes equal to or less than a preset threshold value, it is determined that a protrusion has been added to the surface of the solid filter material. When it is determined that the protrusion has been added, the feeding amount of the protrusion element is reduced (or stopped), as with the step (S3) in the first embodiment.

Water to be treated containing suspended matters is passed through the filter layer 2a (S14), with the feeding amount of the protrusion element reduced (or stopped), as with the step (S4) in the first embodiment.

In the step of passing the water to be treated containing suspended matters (S14), it is preferable to inspect the water quality of the filtrate that has come out from the filter layer, as with the step (S4) in the first embodiment.

The step of forming a biofilm (S15) and the step of backwashing the filter layer (S16) may be performed as with (S5) and (S6) in the first embodiment.

According to the embodiment, measuring the differential pressure between the first side and the second side of the filter layer enables reliable suppression of an increase in the differential pressure due to formation of a protrusion.

According to the embodiment, measuring the amount of the protrusion element in the filtrate that comes out when the protrusion element is fed enables confirmation chat the protrusion element has not come out to the filtrate. Thereby, in an indirect way, it can be confirmed that a protrusion has been formed on the surface of the solid filter material.

Next, a basis for the present invention and a working effect are described.

(Study 1)

Figure 6:
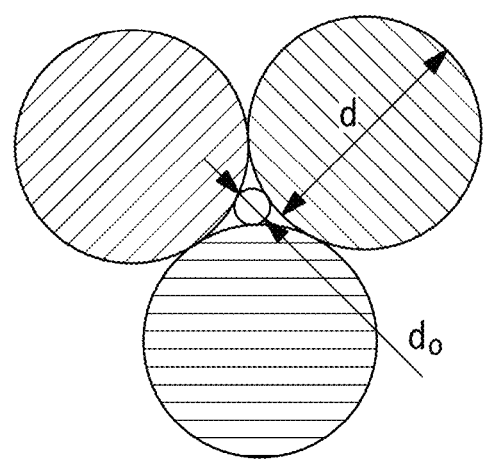
FIG. 6 is a schematic view explaining a passage width $d_o$.

A study was made, through a simulation, regarding a relationship between a capture race and a size of suspended matters captured in a filter layer (captured-particle diameter) at a time when water to be treated containing suspended matters is passed through a filter layer formed by filling a solid filter material. A balance equation in the filtration, in consideration of diffusion by Brownian motion and an interception effect, was made for execution of the simulation. A passage width $d_0$ is equivalent to a diameter of a small circle that is in a region surrounded by three solid filter materials in contact with each other, and is in contact with the three solid filter materials (see FIG. 6). Diffusion of suspended matters due to turbulence of a flow generated by unevenness on a surface is not considered. The solid filter materials had a spherical shape, and particle diameters of 100 μm, 300 μm (a minimum diameter of sand used industrially for sand filtration), and 1200 μm (a maximum diameter of sand used industrially for sand filtration). A filtering speed was 25 m/h (equivalent to cross-sectional porosity of 50% of a sand filter column at a superficial velocity 12.5 m/h). In this simulation, the passage width $d_0$ was same as the particle diameter of the solid filter material.

Figure 7:
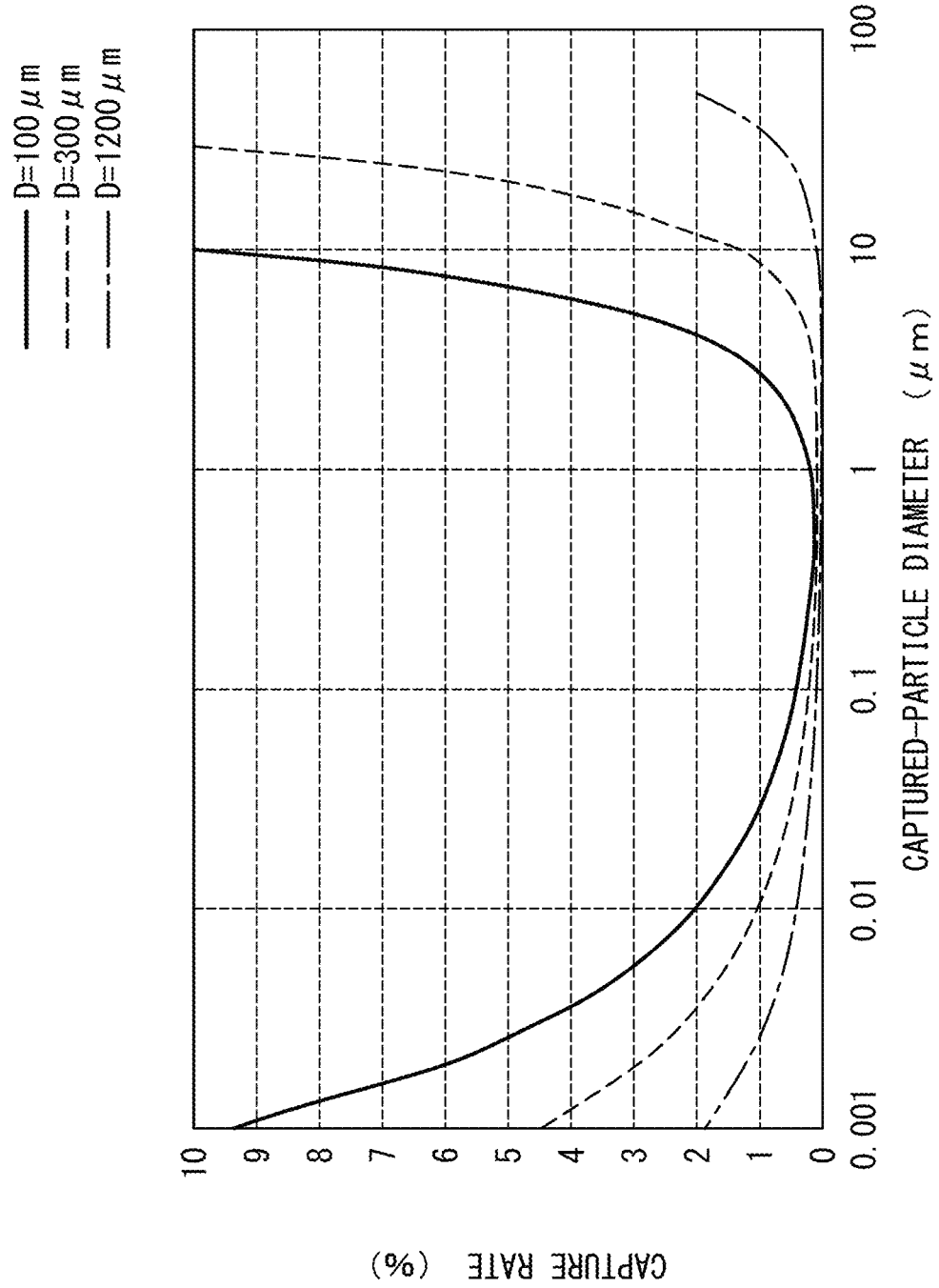
FIG. 7 is a graph showing a simulation result in Study 1.

A simulation result is shown in FIG. 7. In this figure, the horizontal axis is the captured-particle diameter (μm), and the vertical axis is the capture rate (%). According to FIG. 5, as the solid filter material is smaller, the capture rate of suspended matters having a size about 10 μm became higher. However, it was confirmed that suspended matters having a size of 0.1 μm to 5 μm can be hardly captured, even when there was used a solid filter material having a size of a minimum diameter of sand used industrially for sand filtration.

A result of (Study 1) above shows that filtration using the solid filter material can hardly remove suspended matters of 0.1 μm or more to 10 μm or less. This result suggests that, conventionally, as water to be treated contained more suspended matters of 0.1 μm or more to 10 μm or less, water quality of the filtrate was further degraded, even when a same solid filter material was used for the filtration.

Thus, the inventors have concluded that, it is possible to cope with load fluctuation and stabilize the water quality of the filtrate, by removing suspended matters having a size of 0.1 μm or more to 10 μm or less. In conventional filtration using a solid filter material, the reason why suspended matters having a size of 0.1 μm or more to 10 μm or less are not removed is considered as follows.

Figure 8:
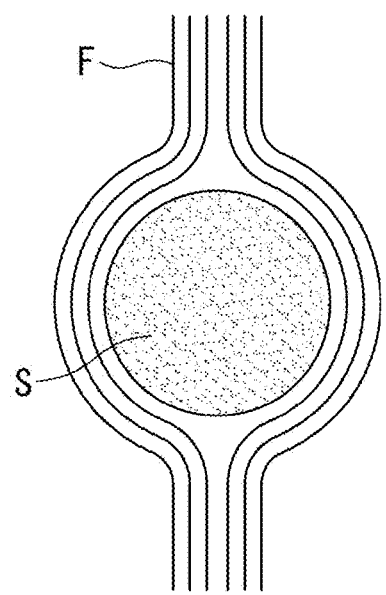
FIG. 8 is a schematic view explaining a flow of water to be treated.

FIG. 8 shows a schematic view of a flow of water to be treated when the water to be treated is passed through the filter layer formed by filling a solid filter material. In this figure, a symbol S represents a solid filter material, and lines F extending in a vertical direction in the figure represent stream lines of the water to be treated. The water to be treated flowing in the filter layer is typically in a laminar flow state as shown in FIG. 8. It is known that, in the laminar flow state, a flow rate of the water to be treated becomes lower as closer to a surface of the solid filter material, and there is a region where the flow rate becomes substantially zero (blocking region) on the surface of the solid filter material.

When the water to be treated is passed through the filter layer formed by filling the solid filter material, coarse suspended matters contained in the water to be treated cannot be passed through a gap of the solid filter material, and are captured. Even among suspended matters having a size capable of being passed through a gap of the solid filter material of the solid filter material, relatively larger suspended matters may come out from the laminar flow by the law of inertia, and collide with the solid filter material to be captured. In the suspended matters contained in the water to be treated, fine suspended matters (colloidal particles with a diameter of less than 0.1 μm) may be captured by the solid filter material due to diffusion by Brownian motion.

Whereas, among the suspended matters contained in the water to be treated, medium sized suspended matters (particles with a diameter of 0.1 μm or more to 10 μm or less) cannot come out of the laminar flow by the law of inertia or the like, and are passed through the filter layer with the laminar flow.

Based on the consideration above, a study was made regarding a method for intentionally removing medium sized suspended matters (particles with a particle diameter of 0.1 μm or more to 10 μm or less) from the laminar flow.

(Study 2)

A study was made, through a simulation, regarding a behavior of suspended matters when water to be treated containing suspended matters is passed through a filter layer formed by filling a solid filter material added with a protrusion. The simulation was performed by using the Lattice Boltzmann Method (method for analyzing a fluid flow by using the molecular kinetic theory, and movement of suspended matters by using a motion equation). Diffusion by Brownian motion is not considered. A passage width $d_0$ was 600 μm, which was equivalent to a diameter of the solid filter material, a length of the passage was 1.5 mm, and a flow rate was 25 m/h (equivalent to cross-sectional porosity of 50% of a sand filter column at a superficial velocity 12.5 m/h). It was assumed that there was a protrusion with a height of 60 μm and a width of 60 μm on a surface of the solid filter material, and particle diameters of suspended matters were 1 μm (suspended matter S1) and 5 μm (suspended matter S2). In this condition, there is no interception effect from the sizes of suspended matters, the size of protrusion, and the passage width.

Figure 9:
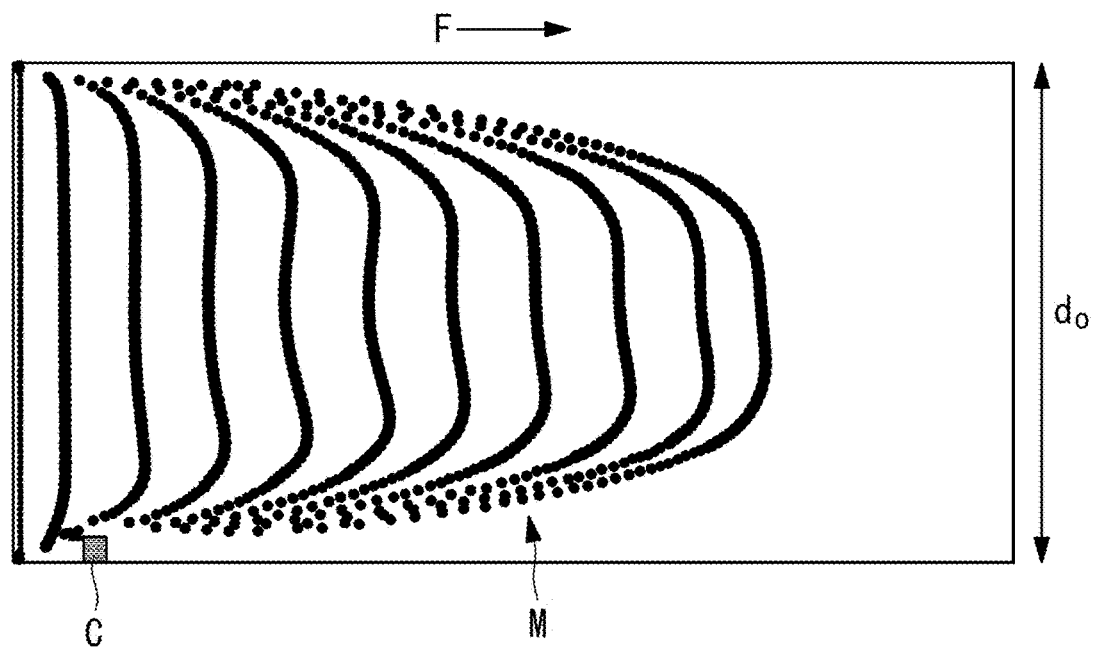
FIG. 9 is a view showing a simulation result in Study 2.

A simulation result is shown in FIGS. 9 to 11. In FIGS. 9 to 11, a vertical direction in the figure is a passage width $d_0$, and the water to be treated flows from left to right in the figure. FIG. 9 is a view showing a flow of suspended matters. FIG. 10 is a view illustrating a state of protrusions in an early stage of passing of the water to be treated, and FIG. 11 is a view illustrating a state of protrusions in a late stage of passing of the water to be treated.

According to FIG. 9, it could be confirmed that a presence of protrusions C caused a microscopic change in a flow direction of suspended matters M. Accordingly, it was confirmed that medium sized suspended matters came out of a laminar flow, and the medium sized suspended matters out of the laminar flow became easy to enter a blocking region, so that a capture rate of the medium sized suspended matters could be increased.

According to FIGS. 10 and 11, it was confirmed that the suspended matters M adhered to the protrusions C when the water to be treated was passed through the filter layer formed by filling the solid filter material formed with a protrusion on a surface. A position where the suspended matters M adhered was a corner facing an upstream side of a passing direction of the water to be treated. It was confirmed that suspended matters adhered to protrusions in the early stage of passing water (FIG. 10), and other suspended matters adhered around the suspended matters, that had adhered to the protrusions in the early stage of passing water, as a core, in the late stage of passing water (FIG. 11), so that the protrusions grown.

Although not illustrated, when the water to be treated was passed through a filter layer filled with a solid filter material not formed with a protrusion on a surface, no suspended matter adhered to the surface of the solid filter material.

A result of (Study 2) above suggests that, by feeding the protrusion element to the filter layer to add a standard amount of the protrusion, suspended matters contained in water to be treated adhere to the protrusion, and thereby the protrusion can be grown, even when the feeding amount of the protrusion element is reduced or stopped afterward.

(Study 3)

Figure 12:
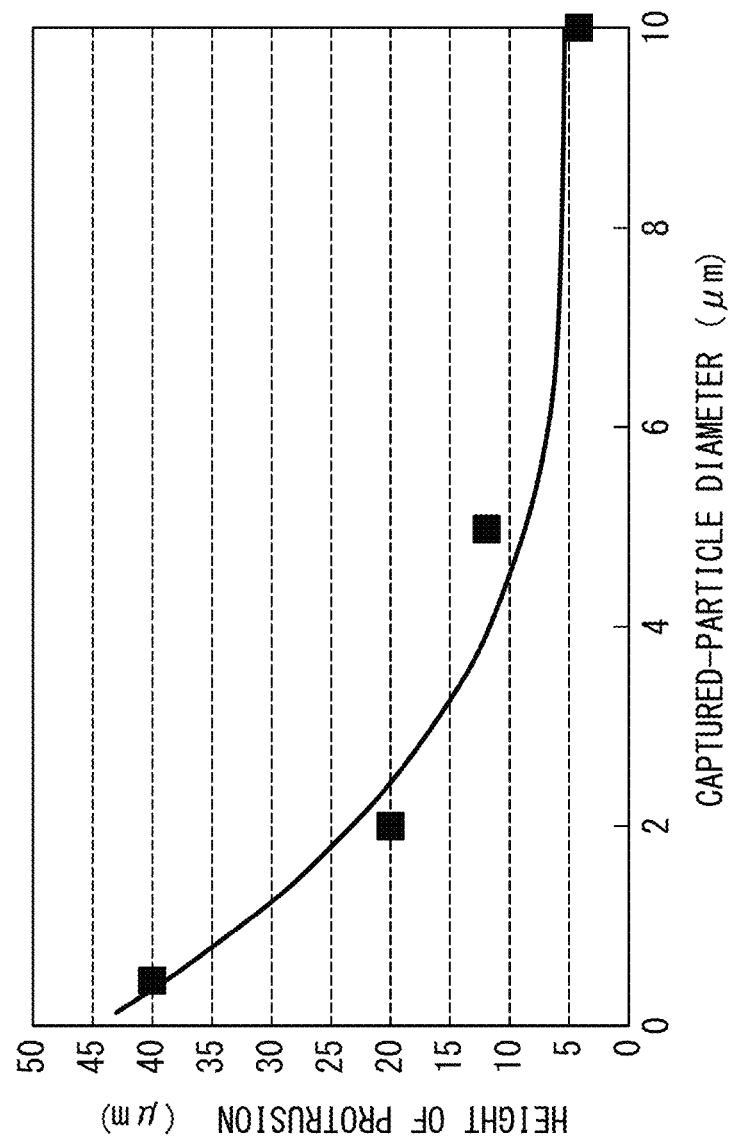
FIG. 12 is a graph showing a simulation result in Study 3.

A study was made, by using the Lattice Boltzmann Method, regarding a minimum size of a protrusion required for adhesion of suspended matters of 0.45 μm (an average pore diameter of a filter for an SDI measurement) to 10 μm in seawater, on a surface of the solid filter material. Diffusion by Brownian motion is not considered. The protrusion is rectangular, and a vertical length from the surface of the solid filter material to the highest portion of the protrusion was defined as a height. Particle diameters of suspended matters were 0.45 μm, 2 μm, 5 μm, and 10 μm, and a calculation was performed for each of the particle diameters. A passage width $d_0$ was 600 μm, which was equivalent to a diameter of the solid filter material, a length of the passage was 1200 μm, and a flow rate was 0.006 m/s (a value equivalent to cross-sectional porosity of 50% of a sand filter column at a superficial velocity 10.8 m/h). A simulation result is shown in FIG. 12. In this figure, the horizontal axis is the captured-particle diameter (μm), and the vertical axis is the height of a protrusion (μm).

According to FIG. 12, as a size of the protrusion is larger, small suspended matters could be captured more. Placing a rectangular body (protrusion) of 4 μm enabled removal of suspended matters of 10 μm. According to FIG. 12, removal of suspended matters of 0.45 μm required a rectangle (protrusion) with a height of 40 μm.

(Study 4)

<Test A>

Protrusion forming liquid containing a protrusion element was passed through a filter layer formed by filling a solid filter material for three hours, to add a protrusion to a surface of the solid filter material. Then, passing of the protrusion forming liquid was stopped, and in that state, water to be treated was passed through the filter layer for three hours. A filtering speed was 10 m/h.

A filter column (column diameter 5 cm) was formed in a three-layered structure of an anthracite filter layer, a sand filter layer, and a gravel filter layer. The anthracite filter layer, the sand filter layer, and the gravel filter layer are sequentially arranged from an upstream side of the passing direction of the water to be treated. The anthracite filter layer is a filter layer formed by filling anthracite with an average particle diameter of 700 μm. A length of the anthracite filter layer is 200 mm. The sand filter layer is a filter layer formed by filling sand with an average particle diameter of 475 μm. A length of the sand filter layer is 500 mm. The gravel filter layer is a filter layer formed by filling gravel with an average particle diameter of 2000 μm. A length of the gravel filter layer is 100 mm.

The protrusion element was made of iron chloride ($FeCl_3$: Wako Pure Chemical Industries. Ltd.). Iron chloride reacts with an alkaline component in water to generate iron hydroxide, as formula (1) below. This iron hydroxide was presumed to adhere to the filter material to form a protrusion.

$$FeCl_3 + 3HCO_3^- = Fe(OH)_3 + 3CO_2 + 3Cl^- \qquad (1)$$

Seawater was used as the water to be treated. An SDI of the seawater before passing was 6.14. Protrusion forming liquid containing the protrusion element was prepared, and the protrusion forming liquid was passed through the filter layer along with the water to be treated. A concentration of the protrusion element in the protrusion forming liquid was set so as to cause an Fe-concentration of 1 ppm with respect to an amount of passing water.

During the passing of the water to be treated, a differential pressure of the filter layer was measured by a differential-pressure measuring device. Additionally, an Fe-concentration and an SDI of liquid (filtrate) that has passed the filter layer were continuously measured. The Fe-concentration was measured by a 2,4,6-tris-2-pyridyl-1,3,5-triazine absorptiometric method (abbreviated as TPTZ absorptiometric method) described in JIS B8224.

The SDI is obtained by the following formula (2) based on a time required for filtration/collection at 206 kPa, by using a filter with a diameter of 47 mm and an average pore diameter of 0.45 μm.

$$SDI_{TM} = (1 - \Delta t_1/\Delta t_2) \times 100/Tm \qquad (2)$$

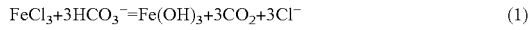

$\Delta t_1$: A time (sec) required for filtration/collection of initial 500 ml.

$\Delta t_2$: A time (sec) required for filtration/collection of 500 ml after Tm minutes.

Tm: A time from the $t_1$ filtration/collection starting time to the $t_1$ filtration/collection starting time (normally 15 minutes).

An upper limit of the SDI index is 6.67. Since the SDI is decreased, it is suggested that a ratio of suspended-matter particles larger than 0.45 μm is decreased.

<Test B>

For comparison, only seawater was passed without passing of the protrusion forming liquid through the filter layer, and the measurement was performed as with Test A.

Figure 13:
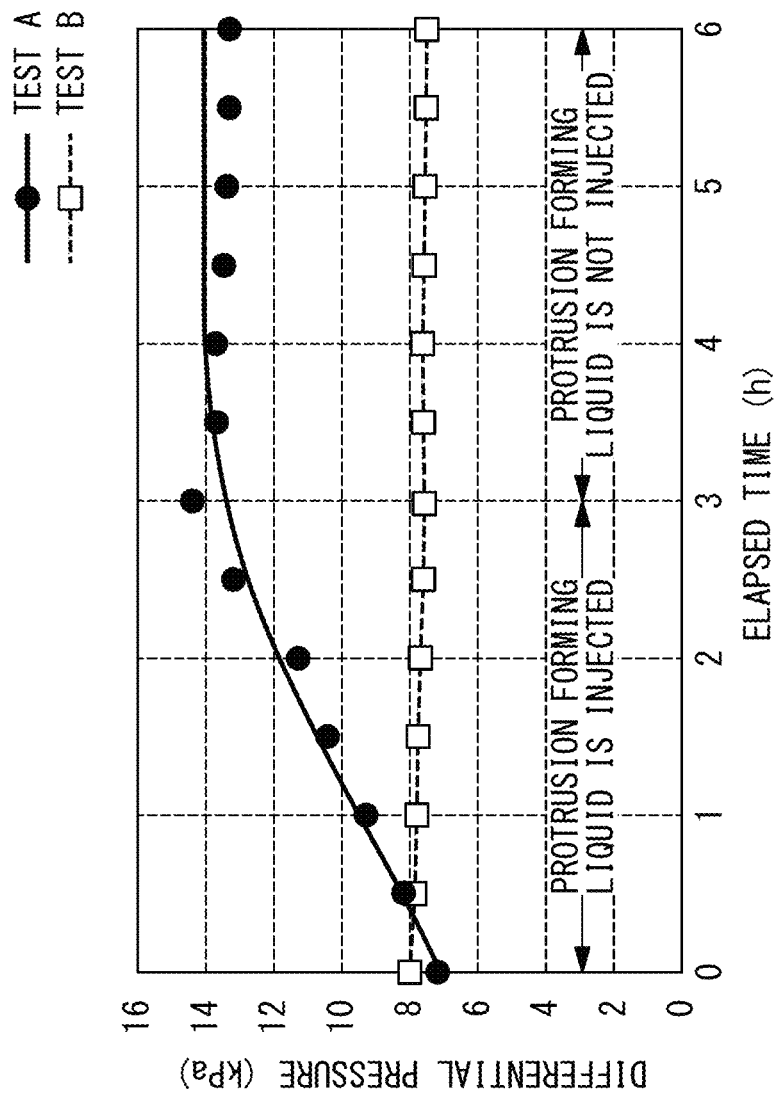
FIG. 13 is a graph showing a measurement result of a differential pressure of a filter layer in Study 4.

FIG. 13 shows a measurement result of a differential pressure of the filter layer. In this figure, the horizontal axis is an elapsed time (h), and the vertical axis is the differential pressure (kPa) of the filter layer. According to FIG. 13, by passing the protrusion forming liquid containing iron hydroxide, the differential pressure of the filter layer was slightly increased in Test A, but an increase in the differential pressure was not observed after the passing of the protrusion forming liquid was stopped. In Test B (a case without passing of protrusion forming liquid), a change in a differential pressure of the filter layer was hardly observed within the same period of time.

Figure 14:
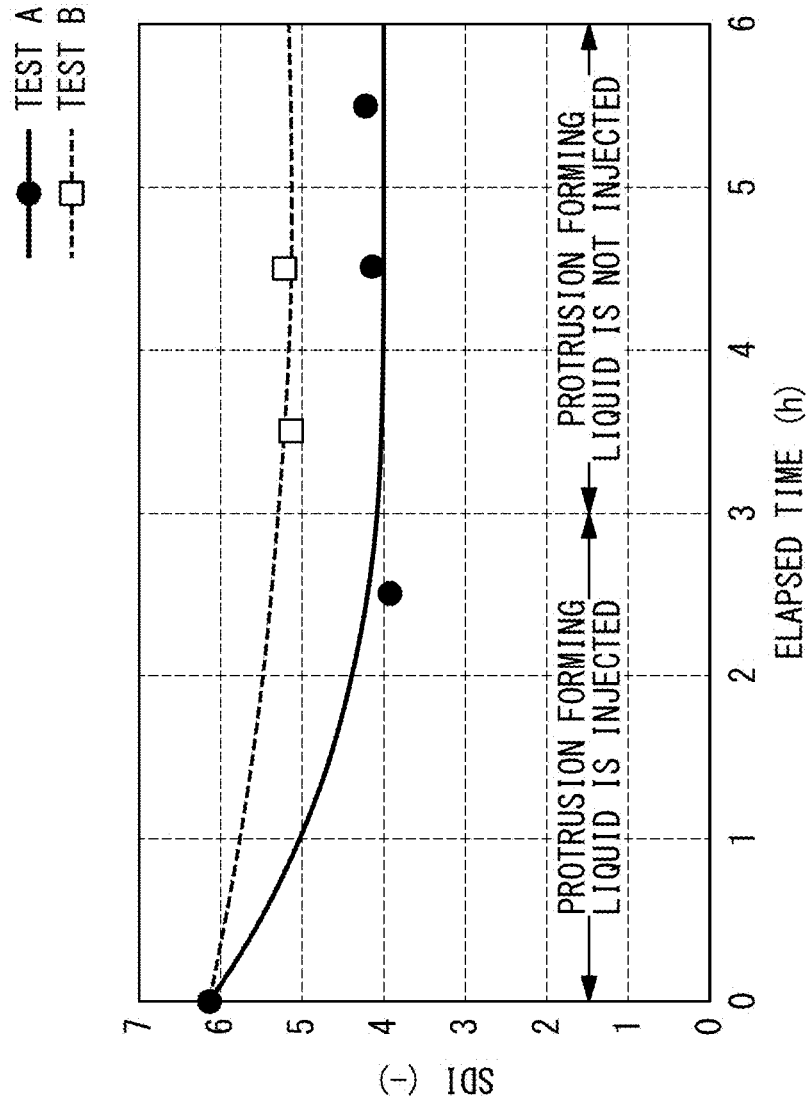
FIG. 14 is a graph showing a measurement result of an SDI of Tests A and B in Study 4.

FIG. 14 shows a measurement result of an SDI of Tests A and 8. In this figure, the horizontal axis is an elapsed time (h), and the vertical axis is the SDI (–).

According to FIG. 14, the SDI of the filtrate was decreased to about 4 after two to three hours of passing in Test A. Even after the passing of the protrusion forming liquid was stopped, the SDI of the filtrate was maintained at about 4.

Although not shown in FIG. 14, an Fe-concentration of the filtrate reached 1 μg/L (detection lower limit) after two hours of the passing in Test A. This shows that the iron hydroxide contained in the protrusion forming liquid remains in the filter layer. After the passing of the protrusion forming liquid was stopped, the Fe-concentration of the filtrate was maintained at 1 μg/L. Accordingly, it could be confirmed that the iron hydroxide remaining in the filter layer was not stripped off by subsequent water passing.

It was confirmed that, it is possible to add a protrusion required to stabilize water quality of the filtrate to the surface of the solid filter material, by passing the protrusion forming liquid for three hours so as to cause an Fe-concentration of 1 ppm with respect to the water to be treated. It is presumed that a suspended-matter removal ability can be maintained unless iron hydroxide comes out from the filter layer.

According to FIG. 14, the SDI of the filtrate remained high at 5.21 when only the water to be treated was passed through without passing of the protrusion forming liquid, as with Test B. In Test B, it is presumed that, although suspended matters were removed with mainly an interception effect and diffusion by Brownian motion, medium suspended matters (0.1 μm to 10 μm) could not be removed, preventing a sufficient decrease of the SDI. It is presumed that the SDI was kept high because medium suspended matters have not been removed.

A result of this Study shows that, after passing of the protrusion forming liquid through the filter layer, the water quality of the filtrate can be improved quickly in two to three hours. Even after the passing of the protrusion forming liquid was stopped, the water quality of the filtrate was stable.

In sand filtration using a typical flocculant, the flocculant is continuously added. The flocculant and sludge formed by suspended matters contained in the water to be treated cause clogging of a filter layer, increasing a differential pressure along with the continuation of the filtration. Thus, in general, the filter layer must be washed in a washing speed in which a developing rate of air washing (washing by collision between filter materials, using air bubbling) and the filter water becomes 30%. Whereas, in the present filtration method, which injects protrusion forming liquid to add a protrusion to a surface of a solid filter material, it is only capturing suspended matters contained in water to be treated, reducing a washing frequency of a solid-filter-material layer without increasing a differential pressure.

(Study 5)

A suspended-mater removal test was performed by using a suspended-matter removing apparatus provided with a coarse-particle separation part (column diameter 5 cm) and a filtering part (column diameter 5 cm).

A sand filtration apparatus was used as the coarse-particle separation part. The sand filtration apparatus has a sand filter layer (length 1200 mm) formed by filling sand with an average particle diameter of 350 μm, and a gravel filter layer (length 100 mm) formed by filling gravel with an average particle diameter of 2000 μm. The sand filter layer is on an upstream side of the gravel filter layer in a passing direction of water to be treated.

The filtering part has a filter layer. The filter layer is configured by an anthracite filter layer (length 200 mm) formed by filling anthracite with an average particle diameter of 700 μm, a sand filter layer (length 1000 mm) formed by filling sand with an average particle diameter of 350 μm, and a gravel filter layer (length 100 mm) formed by filling gravel with an average particle diameter of 2000 μm. The anthracite filter layer, the sand filter layer, and the gravel filter layer are arranged in this order from the upstream side in the passing direction of the water to be treated.

Water to be treated was passed through the coarse-particle separation part by a water-to-be-treated feeding part. Then, filtrate (primarily treated water) that had come out from the coarse-particle separation part was passed through the filtering part. The primarily treated water before entering the filtering part was added with protrusion forming liquid, and the protrusion forming liquid and the primarily treated water were passed in same time. After three hours from the start of passing, the passing of the protrusion forming liquid was stopped. The primarily treated water continued to be passed for three hours even after the passing of the protrusion forming liquid was stopped.

Differential pressures of the coarse-particle separation part and the filtering part were measured by a differential-pressure measuring device, during the passing of the water to be treated and the primarily treated water. Additionally, an SDI of liquid (filtrate) that had passed the filtering part was continuously measured. A filtering speed was 10 m/h.

The protrusion element was made of iron chloride ($FeCl_3$), and the protrusion forming liquid was fed so as to cause an Fe-concentration of 1 ppm with respect to the primarily treated water. An SDI of seawater before passing is 6.28.

Figure 15:
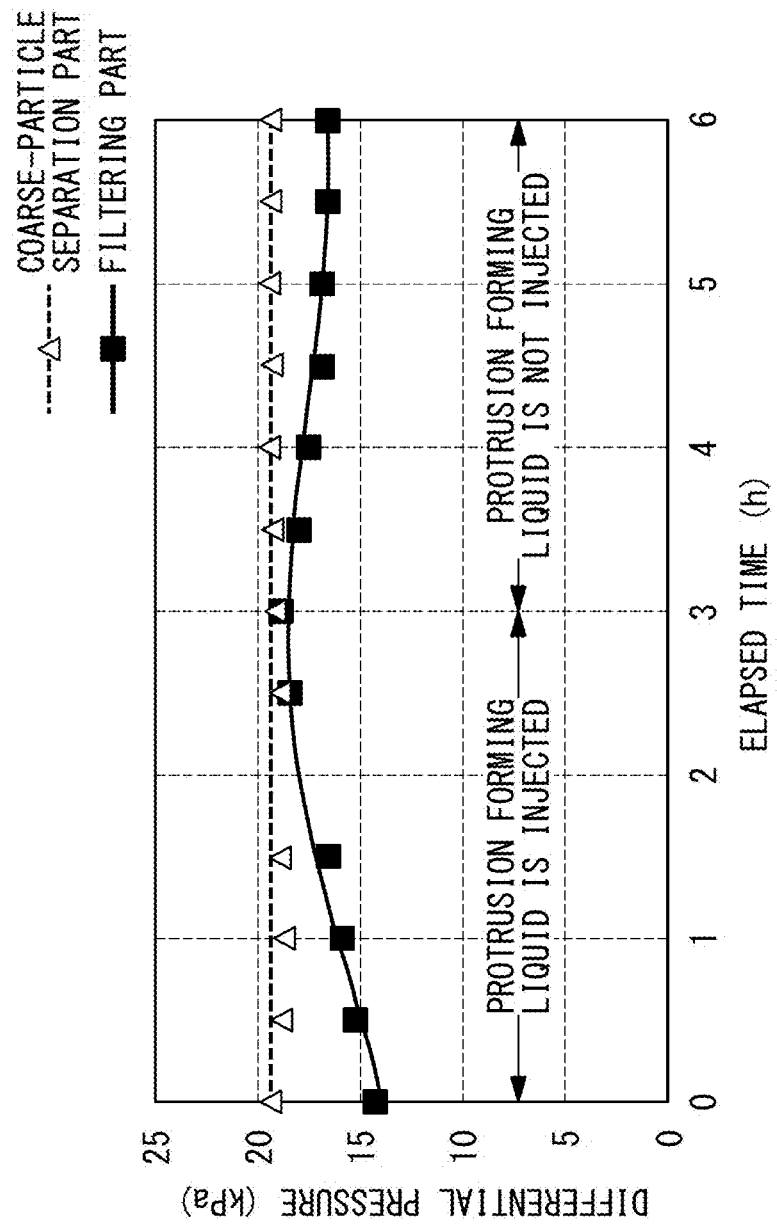
FIG. 15 is a graph showing a measurement result of a differential pressure of a filtering part (filter layer) in Study 5.

FIG. 15 shows a measurement result of differential pressures of the coarse-particle separation part and the filtering part (filter layer). In this figure, the horizontal axis is an elapsed time (h), and the vertical axis is the differential pressure (kPa). According to FIG. 15, during the passing of the water to be treated, a change in the differential pressure of the filtering part was hardly observed at the coarse-particle separation part. According to FIG. 15, while the differential pressure of the filtering part was slightly increased during the passing of the protrusion forming liquid, an increase in the differential pressure was not observed during the passing of only the primarily treated water after the passing of the protrusion forming liquid was stopped.

Figure 16:
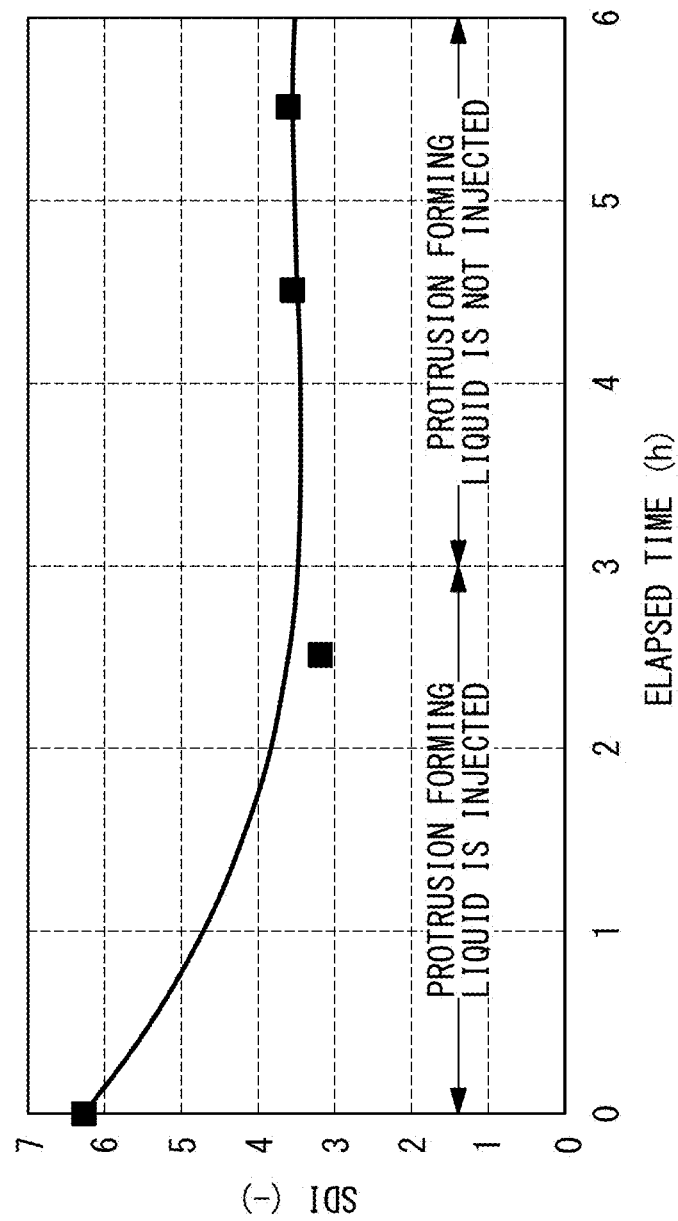
FIG. 16 is a graph showing a measurement result of an SDI of filtrate that has come out from the filtering part (filter layer) in Study 5.

FIG. 16 shows an SDI measurement result of the filtrate that has come out from the filtering part. In this figure, the horizontal axis is an elapsed time (h), and the vertical axis is the SDI (-). According to FIG. 16, although the SDI of seawater before passing was 6 or more, the SDI of the filtrate of the filtering part was decreased to less than 4 after two to three hours of passing of the protrusion forming liquid. The SDI of the filtrate of the filtering part could be maintained at less than 4, even after the passing of the protrusion forming liquid was stopped. While a standard of a turbidity concentration required for feed water to an RO (reverse osmosis) membrane is generally SDI<4, the filtrate of two to three hours of passing satisfied the water quality standard.

Based on the results of Studies 1 to 3, it is presumed that the coarse-particle separation part mainly captures suspended matters smaller than 0.1 μm, and suspended matters larger than 10 μm. Since the SDI has been decreased by the passing the primarily treated water from which coarse particles are removed through the filtering part (filtering layer), the filter layer seems to capture medium sized suspended matters of 0.1 μm or more to 10 μm or less.

(Study 6)

A suspended-mater removal test was performed by using a suspended-matter removing apparatus provided with a coarse-particle separation part (column diameter 5 cm) and a filtering part (column diameter 5 cm). A sand filtration apparatus was used as the coarse-particle separation part. The sand filtration apparatus has a sand filter layer (length 800 mm) formed by filling sand with an average particle diameter of 350 μm, and a gravel filter layer (length 100 mm) formed by filling gravel with an average particle diameter of 2000 μm. The sand filter layer is on an upstream side of the gravel filter layer in a passing direction of water to be treated.

The filtering part has a filter layer. The filter layer is configured by an anthracite filter layer (length 200 mm) formed by filling anthracite with an average particle diameter of 700 μm, a sand filter layer (length 600 mm) formed by filling sand with an average particle diameter of 350 μm, and a gravel filter layer (length 100 mm) formed by filling gravel with an average particle diameter of 2000 μm. The anthracite filter layer, the sand filter layer, and the gravel filter layer are arranged in this order from the upstream side in the passing direction of the water to be treated.

Water to be treated was passed through the coarse-particle separation part by a water-to-be-treated feeding part. Then, filtrate (primarily treated water) that had come out from the coarse-particle separation part was passed through the filtering part. The primarily treated water before entering the filtering part was added with protrusion forming liquid, and the protrusion forming liquid and the primarily treated water were passed in same time. After three hours from the start of passing, the passing of the protrusion forming liquid was stopped. The primarily treated water continued to be passed through for three hours even after the passing of the protrusion forming liquid was stopped.

Differential pressures of the coarse-particle separation part and the filtering part were measured by a differential-pressure measuring device, during the passing of the water to be treated and the primarily treated water. Additionally, an SDI of liquid (filtrate) that had passed the filtering part was continuously measured. A filtering speed was 10 m/h.

The protrusion element was made of kaolin. As the kaolin, powder with an average particle diameter of 10 to 15 μm was used (made by Takehara Kagaku Kogyo Co., Ltd.). The protrusion forming liquid was fed to cause a kaolin concentration of 2 ppm with respect to the primarily treated water. An SDI of seawater before passing is 5.2.

Figure 17:
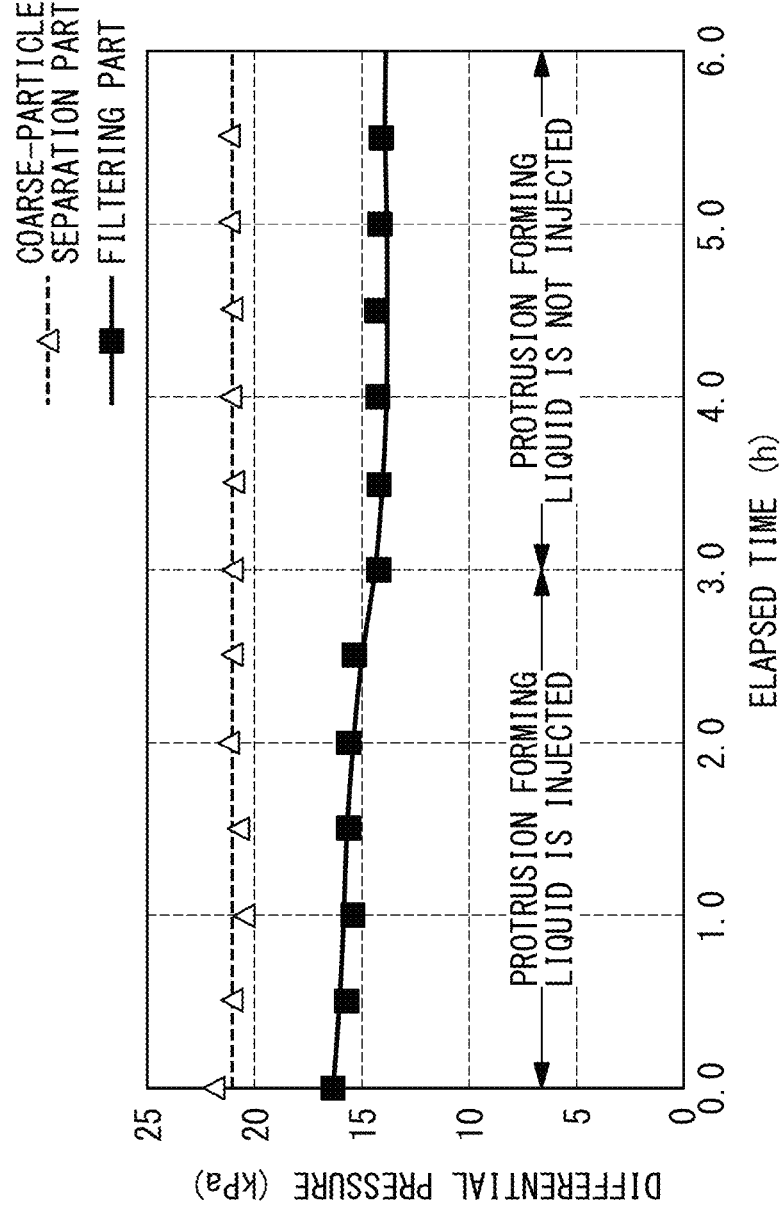
FIG. 17 is a graph showing a measurement result of differential pressures of a coarse-particle separation part and a filtering part (filter layer) in Study 6.

FIG. 17 shows a measurement result of differential pressures of the coarse-particle separation part and the filtering part (filter layer). In this figure, the horizontal axis Is an elapsed time (h), and the vertical axis is the differential pressure (kPa). According to FIG. 17, during the passing of the water to be treated, a change in differential pressures of the coarse-particle separation part and the filtering part was hardly observed.

Figure 18:
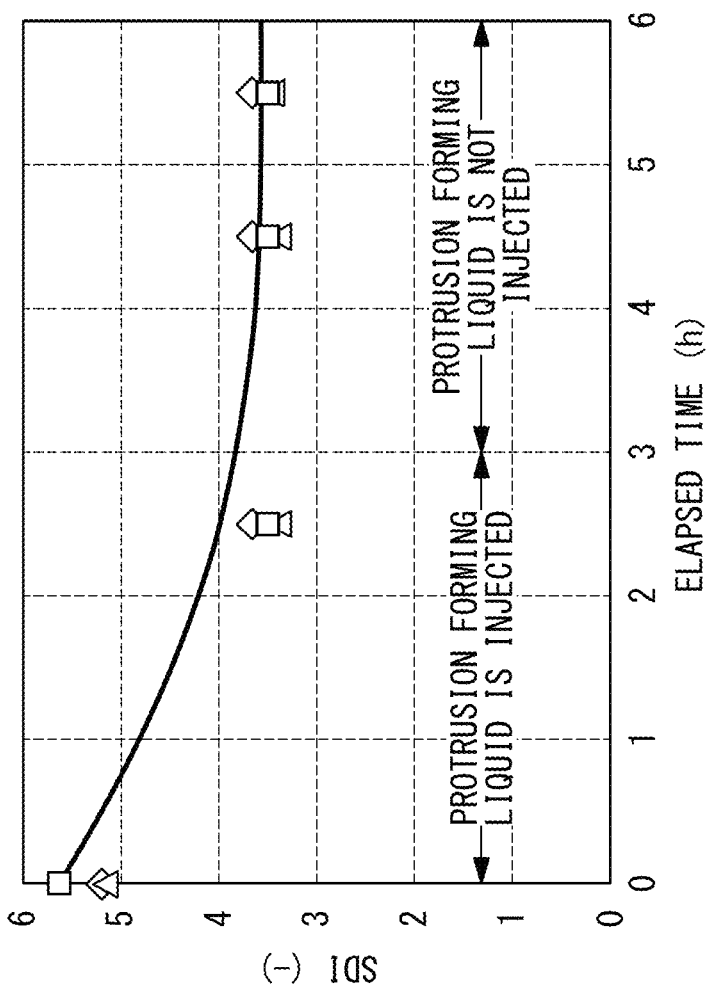
FIG. 18 is a graph showing a measurement result of an SDI of filtrate that has come out from the filtering part (filter layer) in Studies 6, 7, and 8.

FIG. 18 shows an SDI measurement result of the filtrate that has come out from the filtering part. In this figure, the horizontal axis is an elapsed time (h), and the vertical axis is the SDI (–). According to The FIG. 18, after the passing of the protrusion forming liquid through the filter layer, the SDI of the filtrate quickly fell to below 4. It is presumed that the kaolin is captured to form a protrusion, and the protrusion removes medium sized suspended matters. Here, it was confirmed that an increase in differential pressures of the coarse-particle separation part and the filtering part was small.

As an index that indicates a performance of a filter column, an L/D is used. The L/D is obtained by dividing a layer thickness L by a particle diameter D. The L/D is a value proportional to a total area of the filter material per unit filtration area, and as this value is larger, a surface area of the filter material per unit filtration area is larger. The L/D of this testing apparatus was 4385. The L was calculated from an input amount of kaolin, and the L/D calculated by using a particle diameter of 12.5 μm (an arithmetic average of an average particle diameter) was 0.4. Thus, it is found that SDI<4 can be satisfied without an increase of the surface area.

(Study 7)

Protrusion forming liquid containing high-molecular polymer as a protrusion element was fed to primarily treated water, and a differential pressure of a filtering part and an SDI of filtrate of the filtering part were measured, as with (Study 6) above. A filtering speed was 10 m/h.

A solid filter material and a filter layer are same as those in (Study 6) above. As the high-molecular polymer, there was used Himoloc Q707 (polyamide based, molecular weight (estimate)=70,000, specific gravity=1.15) made by HYMO CORPORATION. The protrusion forming liquid was fed so as to cause a high-molecular polymer concentration of 0.5 ppm with respect to the primarily treated water. The water to be treated is Seawater. An SDI of the seawater before passing was 5.2.

Figure 19:
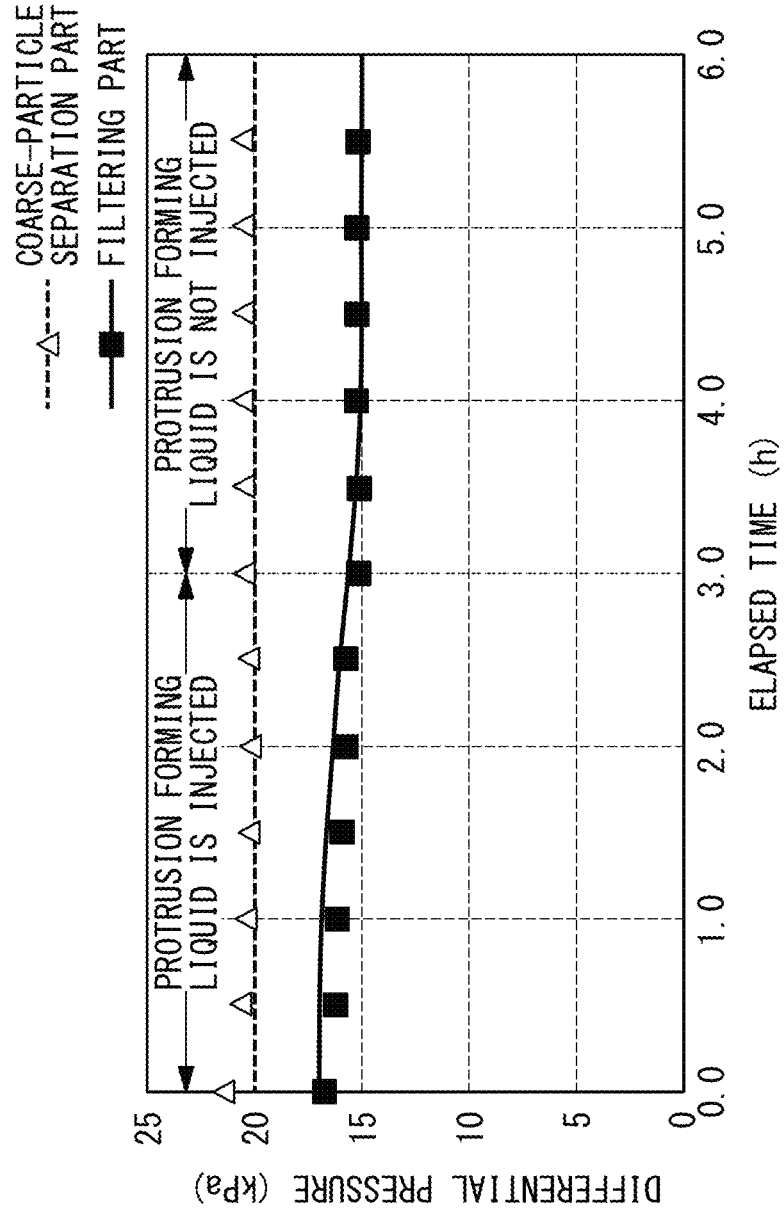
FIG. 19 is a graph showing a measurement result of differential pressures of a coarse-particle separation part and a filtering part (filter layer) in Study 7.

FIG. 19 shows a measurement result Of differential pressures of a coarse-particle separation part and the filtering part (filter layer). In this figure, the horizontal axis is an elapsed time (h), and the vertical axis is the differential pressure (kPa) of the filter layer. According to FIG. 19, during the passing of the water to be treated, a change in differential pressures of the coarse-particle separation part and the filtering part was hardly observed.

FIG. 18 shows an SDI measurement result of the filtrate that has come out from the filtering part. According to FIG. 18, although the SDI of seawater was 5.2, the SDI of the filtrate of the filtering part was decreased to less than 4 after two to three hours of passing of the protrusion forming liquid. The SDI of the filtrate of the filtering part could be maintained at less than 4, even after the passing of the protrusion forming liquid was stopped. It was considered that the high-molecular polymer had utilized suspended matters in the seawater to form a protrusion on the surface of the solid filter material, causing a decrease in the SDI. Here, it was confirmed that an increase in differential pressures of the coarse-particle separation part and the filtering part was small.

(Study 8)

Protrusion forming liquid containing kaolin and high-molecular polymer as a protrusion element was fed to primarily treated water, and a differential pressure of the filtering part and an SDI of the filtrate of the filtering part were measured, as with (Study 6) above. A filtering speed was 10 m/h.

A solid filter material and a filter layer are same as those in (Study 6) above. As the kaolin, powder with an average particle diameter of 10 to 15 μm was used (made by Takehara Kagaku Kogyo Co., Ltd.). As the high-molecular polymer, there was used Himoloc Q707 (polyamide based, molecular weight (estimate)=70,000. specific gravity=1.15) made by HYMO CORPORATION. The protrusion forming liquid was fed so as to cause kaolin of 2 ppm and high-molecular polymer of 0.5 ppm with respect to the primarily treated water. The water to be treated is Seawater. An SDI of the seawater before passing was 5.6.

Figure 20:
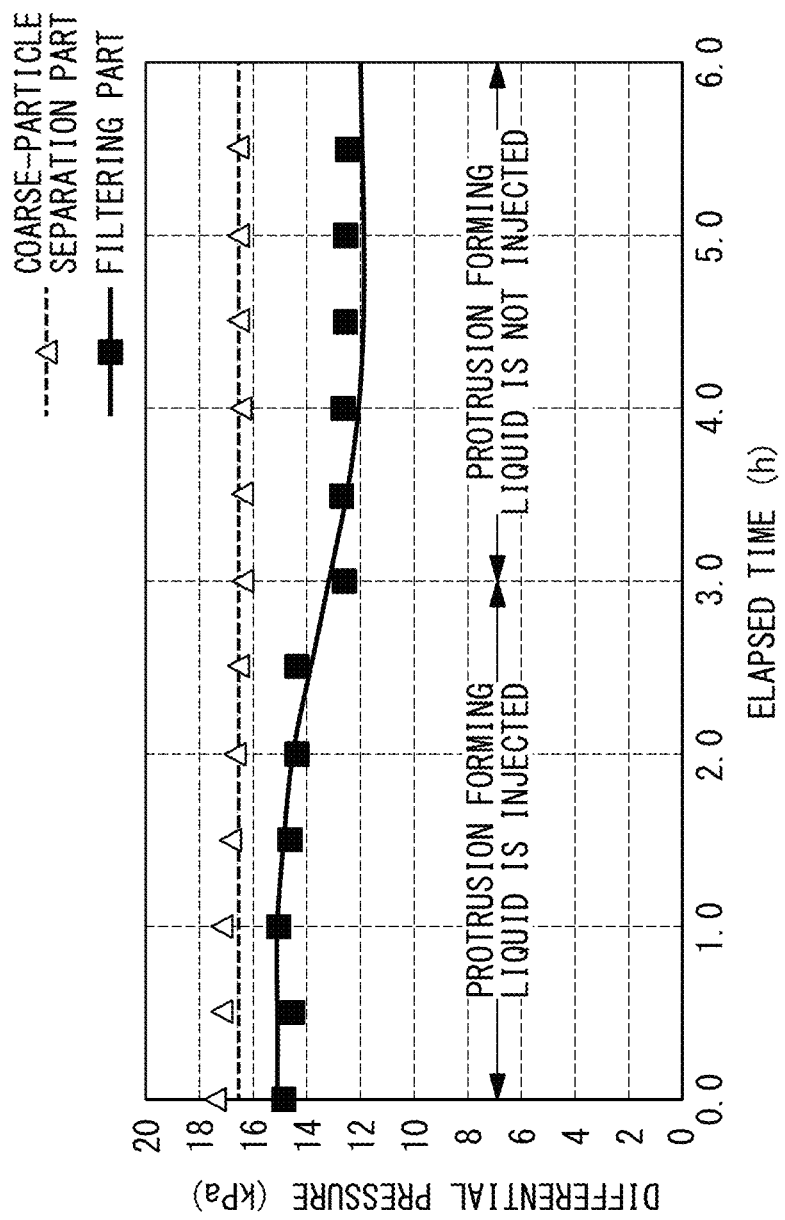
FIG. 20 is a graph showing a measurement result of differential pressures of a coarse-particle separation part and a filtering part (filter layer) in Study 8.

FIG. 20 shows a measurement result of the differential pressures of the coarse-particle separation part and the filtering part (filter layer). In this figure, the horizontal axis is an elapsed time (h), and the vertical axis is the differential pressure (kPa) of the filter layer. According to FIG. 20, during the passing of the water to be treated, a change in the differential pressure of the filtering part was hardly observed at the coarse-particle separation part. According to FIG. 20, during the passing of the protrusion forming liquid, the differential pressure of the filtering part was not increased, and even after the passing of the protrusion forming liquid was stopped, the differential pressure of the filtering part was not increased.

FIG. 18 shows an SDI measurement result of the filtrate that has come out from the filtering part. According to FIG. 18, although the SDI of the seawater before passing was 5.6 or more, the SDI of the filtrate of the filtering part was decreased to less than 4 after two to three hours of passing of the protrusion forming liquid. The SDI of the filtrate of the filtering part could be maintained at less than 4, even after the passing of the protrusion forming liquid was stopped. It was presumed that the kaolin and the high-molecular polymer formed a protrusion on the surface of the solid filter material, causing a decrease the SDI.

(Study 9)

Filtration was performed by passing seawater that has been primarily filtered at a constant filtering speed, through a filter layer formed by filling a solid filter material. Then, the filtered water was passed at a predetermined speed for ten minutes from a direction opposite to the filtration direction at every 48 hours. A filtering speed was 12 m/h. A washing speed was 20 m/h.

A filter column (column diameter 30 cm) was formed in a one-layered structure of a sand filter layer. The sand filter layer is a filter layer formed by filling sand with an average particle diameter of 450 μm. A length of the sand filter layer is 600 mm.

Figure 21:
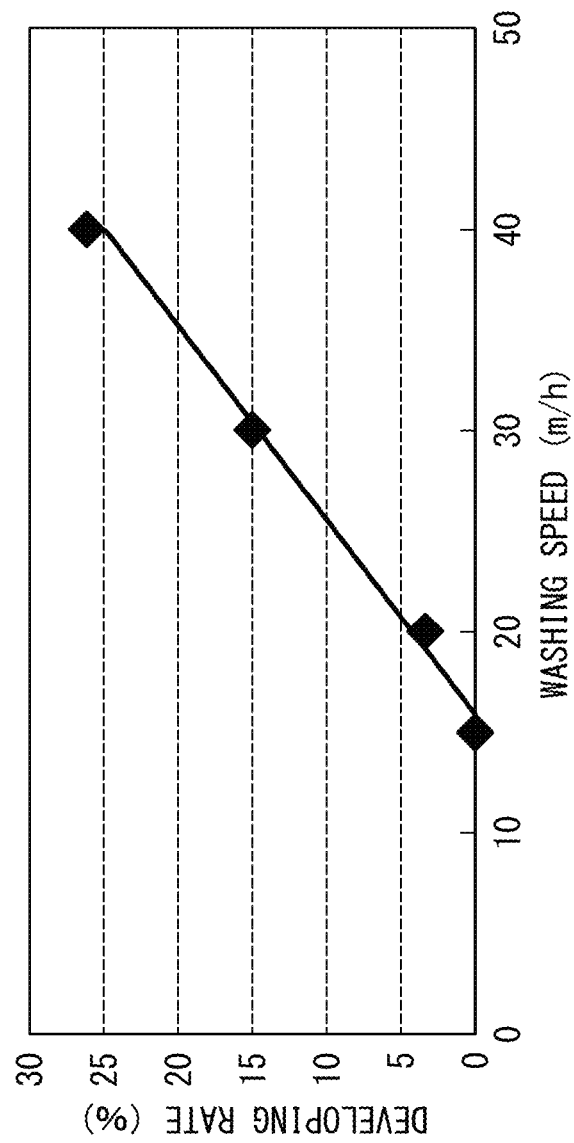
FIG. 21 is a graph showing a calculation result of a relation between a washing speed and a developing rate in Study 9.

FIG. 21 shows a calculation result of a relation between a washing speed and a developing rate. In this figure, the horizontal axis is washing (m/h), and the vertical axis is the developing rate (%). According to FIG. 21, when an average particle diameter was 450 μm, temperature was 25° C., and a salt concentration=35 g/kg, washing of the filter layer in this test at a washing speed of 20 m/h caused the developing rate of sand to become about 3%. Washing at 40 m/h or more caused the developing rate to become 30%, which is generally used for a sand filter layer using a flocculant.

During the passing of the seawater that had been primarily filtered, a differential pressure of the filter layer was measured by a differential pressure meter. Additionally, an SDI after 30 minutes from the end of washing, and an SDI immediately before next washing were measured.

For comparison, the washing speed was changed to a predetermined speed, and influence of washing speed on the differential pressure and on the SDI after washing was verified. In this test, the developing rates (washing speeds) were a developing rate 0% (15 m/h), a developing rate 3.3% (20 m/h), a developing rate 15% (30 m/h), and a developing rate 26% (40 m/h).

Figure 22:
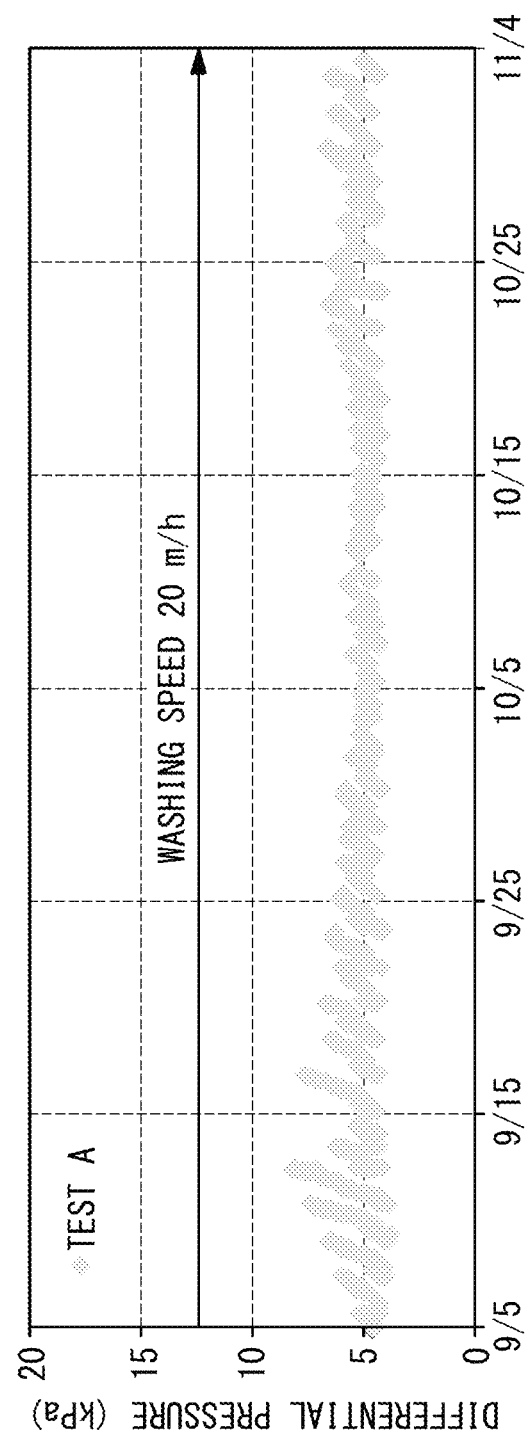
FIG. 22 is a graph showing a relation between a washing speed and a differential pressure of Test A in Study 9.
Figure 23:
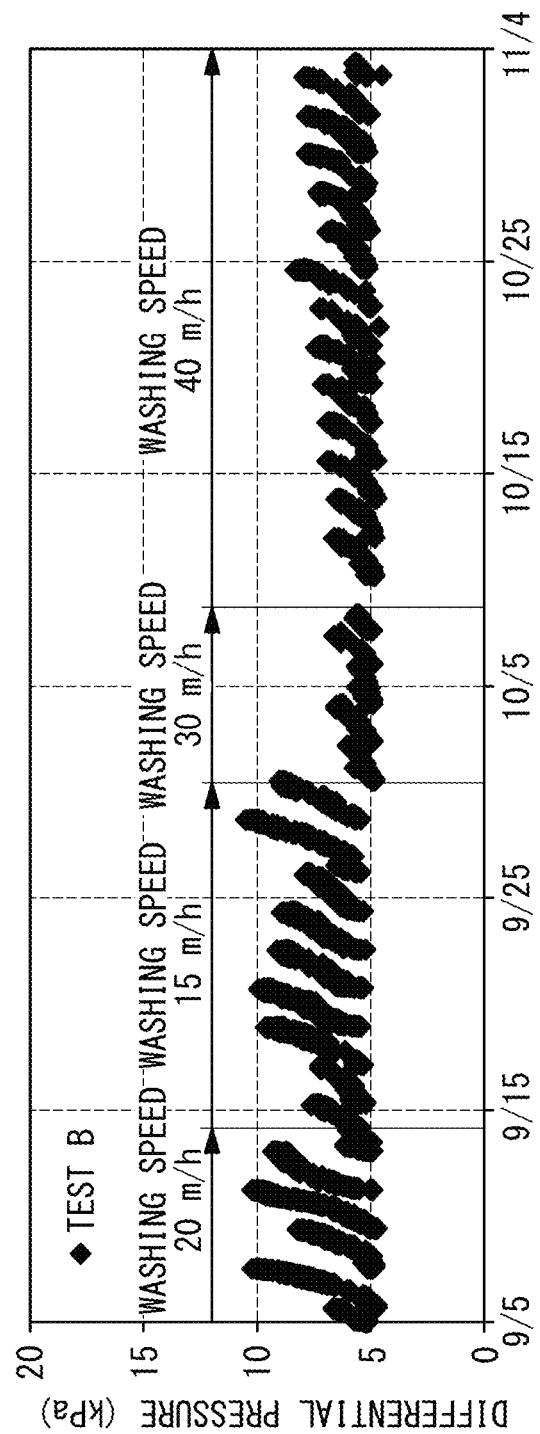
FIG. 23 is a graph showing a relation between a washing speed and a differential pressure of Test B In Study 9.

FIGS. 22 and 23 show a relation between a washing speed and a differential pressure. FIG. 22 is a graph showing when the washing was performed at the washing speed 20 m/h (Test A). FIG. 23 is a graph showing when the washing was performed at the washing speeds 20 m/h, 15 m/h, 30 m/h, and 40 m/h (Test B). In FIGS. 22 and 23, the horizontal axis is a date when the study was made, and the vertical axis is the differential pressure of the filter layer. Both of the initial differential pressures of filter column are 5 kpa. When washing was performed at the washing speeds that were set in the Tests A and B, the differential pressure after washing became 5 kpa, which was equal to the initial differential pressure, at all the washing speeds. It was confirmed that, although suspended matters had been captured through the filtration, and the differential pressure had been increased, the washing stripped the suspended matters that had increased the differential pressure, and reset the differential pressure.

Figure 24:
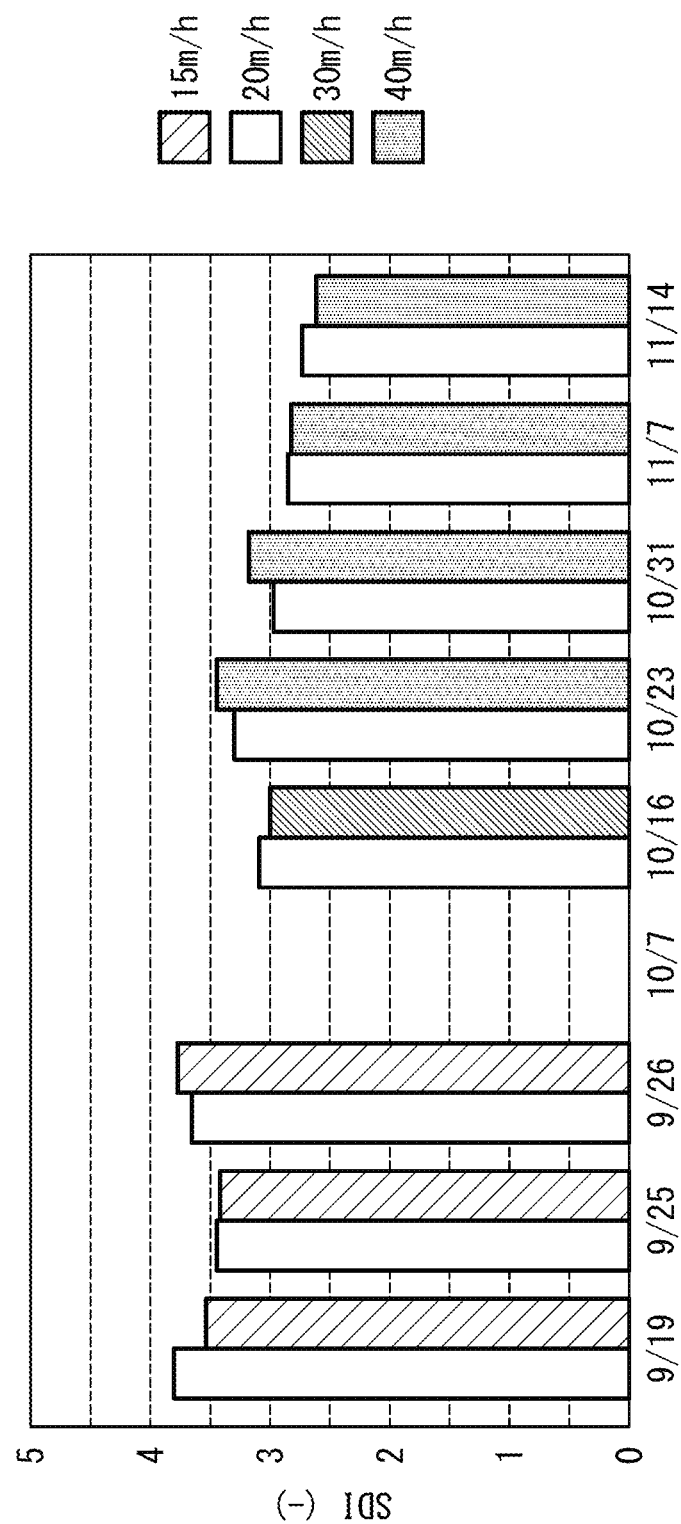
FIG. 24 is a graph showing a relation between a washing speed and an SDI immediately before next washing in Study 9.

FIG. 24 shows a relation between a washing speed and an SDI immediately before the next washing (46 to 47 h after washing). In this figure, the horizontal axis is a date when the study was made, and the vertical axis is the SDI (-) of the filtrate of the water to be treated. According to FIG. 24, in the measurement of the SDI immediately before the next washing, even when the developing rate was changed from 0% to 26% (from 15 m/h to 40 m/h in washing speed) with respect to the developing rate 3.3% (washing speed 20 m/h), no difference was observed in the SDI. It was confirmed that the washing speed had no influence on the SDI of the filtrate.

Figure 25:
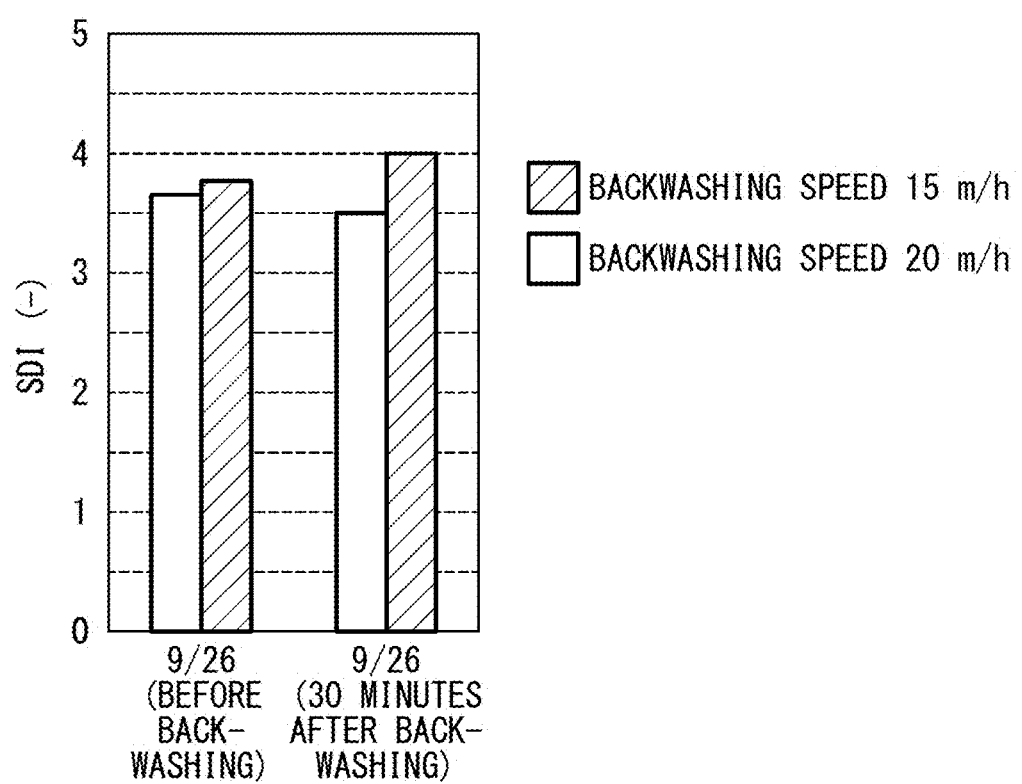
FIG. 25 is a graph showing a relation between a washing speed and an SDI 30 minutes after washing in Study 9.

FIG. 25 shows a relation between a washing speed and an SDI after 30 minutes from washing. In this figure, the horizontal axis is a date (time) when the study was made, and the vertical axis is the SDI (-) of the filtrate of the water to be treated. As regards the water quality 30 minutes after washing, the SDI is higher when the washing has been performed at a developing rate 0% (washing speed 15 m/h) than when the washing has been performed at a developing rate 3.3% (washing speed 20 m/h). It could be confirmed that the decrease in the SDI after washing was faster at the developing rate 3.3% (washing speed is 20 m/h). It is presumed that backwashing at 20 m/h that causes filter sand to develop is desirable to shorten a rise time after washing.

In sand filtration using a flocculant, in order to strip off sludge that is derived from the flocculant and has adhered to sand filter, washing is strongly performed by air washing at a washing speed to cause a developing rate of about 30%.

This test result has shown that a washing effect can be obtained even by gentle washing with a reduced developing rate. It has been found that a washing effect can be obtained even by washing that reduces a developing rate of a filter layer and appropriately strips off a biofilm without performing air washing, rather than a strong washing that increases the developing rate and strips off all the biofilm formed on a solid filter material layer by performing air washing.

Washing with a reduced developing rate without performing air washing is considered to be able to reduce power.

REFERENCE SIGNS LIST 1, 21 suspended-matter removing apparatus
2 filtering part
2a filter layer
2b first opening
2c second opening
3 water-to-be-treated feeding part
3a water-to-be-treated tank
3b first feeding means
4 protrusion-element feeding part
4a protrusion element tank
4b second feeding means
5 water-quality inspection part
6 determination part
7 protrusion-forming control part (control part)
8 first passage
9 second passage
10 SBS adding part
11 reverse-osmosis-membrane treatment part
22 coarse-particle separation part

The invention claimed is:

1. A suspended-matter removing method utilizing a biofilm, comprising the steps of:
   feeding a protrusion element to a filter layer formed of a solid filter material, thereby adding a protrusion to a surface of the solid filter material;
   determining whether or not a protrusion satisfying a preset standard has been added to the surface of the solid filter material;
   when it is determined that the protrusion has been added, reducing a feeding amount of the protrusion element as compared with when adding the protrusion;
   forming a biofilm on the surface of the solid filter material; and
   passing water to be treated including suspended matters through the filter layer having the solid filter material added with the protrusion in a state in which the feeding amount of the protrusion element is reduced.

2. The suspended-matter removing method according to claim 1, wherein the feeding of the protrusion element is stopped, in the step of reducing the feeding amount of the protrusion element.

3. The suspended-matter removing method according to claim 1, further comprising a step of passing the water to be treated through the filter layer at the same time as the step of adding a protrusion.

4. The suspended-matter removing method according to claim 1, wherein in determining whether or not a protrusion satisfying the preset standard has been added to the surface of the solid filter material, further comprising a step of inspecting water quality of the filtrate that has come out from the filter layer, wherein
when an inspection value of the filtrate exceeds a preset threshold value, it is determined that the protrusion satisfying the preset standard has not been formed on the surface of the solid filter material, and the step of adding a protrusion is performed; and
when the inspection value of the filtrate is equal to or less than the preset threshold value, it is determined that the protrusion satisfying the preset standard has been added to the surface of the solid filter material, and the feeding amount of the protrusion element is reduced as compared with when the protrusion is added.

5. The suspended-matter removing method according to claim 1, wherein in determining whether or not a protrusion satisfying the preset standard has been added to the surface of the solid filter material, further comprising a step of measuring a differential pressure between a first side of the filter layer and a second side of the filter layer, wherein
the protrusion element is fed within a range in which the measured differential pressure is less than a predetermined value, in the step of adding a protrusion.

6. The suspended-matter removing method according to claim 1, wherein in determining whether or not a protrusion satisfying the preset standard has been added to the surface of the solid filter material, further comprising a step of directly or indirectly measuring an amount of the protrusion element contained in filtrate that has come out from the filter layer in the step of adding the protrusion, wherein it is determined that the protrusion satisfying the preset standard has been added to the surface of the solid filter material when the measured amount of the protrusion element becomes equal to or less than a preset threshold value.

7. The suspended-matter removing method according to claim 1, wherein in determining whether or not a protrusion satisfying the preset standard has been added to the surface of the solid filter material, a total feeding amount of the protrusion element to the filter layer in the step of adding a protrusion is counted, and it is determined that the protrusion satisfying the preset standard has been added to the surface of the solid filter material when the counted total feeding amount reaches a preset threshold value.

8. The suspended-matter removing method according to claim 1, wherein
in the step of passing the water to be treated, the water to be treated is passed through a coarse-particle separation part to make the water to be treated into primarily treated water by mainly separating suspended matters larger than 10 μm contained in the water to be treated, and
then the water to be primarily treated is passed through the filter layer to removed suspended matters having a size of 0.1 μm or more to 10 μm or less.

9. The suspended-matter removing method according to claim 1, wherein sodium hydrogen sulfite is added to the water to be treated, and then the water to be treated is passed through the filter layer.

10. The suspended-matter removing method according to claim 1, wherein a height of the protrusion is 4 μm or more.

11. The suspended-matter removing method according to claim 1, wherein an average particle diameter of the solid filter material is 300 μm or more to 2500 μm or less.

12. The suspended-matter removing method according to claim 1, wherein the protrusion element is made of kaolin.

13. The suspended-matter removing method according to claim 1, wherein the protrusion element is made of iron chloride.

14. The suspended-matter removing method according to claim 13, wherein, in the step of reducing the feeding amount of the protrusion element, the feeding amount of the protrusion element is reduced such that content of the protrusion element becomes less than 0.5 ppm as iron in solution that passes the filter layer.

15. The suspended-matter removing method according to claim 1, wherein the protrusion element is made of high-molecular polymer.

16. The suspended-matter removing method according to claim 1, further comprising a step of backwashing the filter layer by passing washing liquid through the filter layer in a direction opposite to a passing direction of the water to be treated such that the protrusion is retained on the surface of the solid filter material.

17. The suspended-matter removing method according to claim 16, wherein, in the step of backwashing the filter layer, a passing speed of the washing liquid is controlled so as to suppress a developing rate of the solid filter material to retain the protrusion on the surface of the solid filter material.

18. The suspended-matter removing method according to claim 17, wherein the washing liquid is passed through the filter layer without a step of air washing that backwashes the filter layer by introducing air.

19. The suspended-matter removing method according to claim 16, wherein, in the step of backwashing the filter layer, a developing rate of the filter layer is obtained and the developing rate of the filter layer is made to become more than 0% less than 30%.

20. The suspended-matter removing method according to claim 1, further comprising the steps of:
backwashing the filter layer by passing washing liquid to the filter layer in a direction opposite to a passing direction of water to be treated;
collecting backwash filtrate generated by the backwashing; and
passing the backwash filtrate through the filter layer toward the passing direction of the water to be treated, and reforming a protrusion on the surface of the solid filter material.

21. The suspended-matter removing method according to claim 1, further comprising the steps of:
backwashing the filter layer by passing washing liquid to the filter layer in a direction opposite to a passing direction of the water to be treated;
collecting backwash filtrate generated by the backwashing; and
passing the backwash filtrate through the filter layer toward the passing direction of the water to be treated, and reforming a protrusion on the surface of the solid filter material.

22. A suspended-matter removing apparatus utilizing a biofilm, comprising:
- a filtering part having a filter layer formed by filling a solid filter material;
- a water-to-be-treated feeding part that feeds water to be treated to a first side of the filtering part to pass the water to be treated through the filter layer;
- a protrusion-element feeding part that feeds a protrusion element to the first side of the filtering part;
- a water-quality inspection part that inspects water quality of filtrate that has come out from a second side of the filtering part;
- a determination part that, based on a preset standard, determines whether or not a protrusion has been added to the surface of the solid filter material; and
- a control part that, when the determination part determines that the protrusion has not been formed, controls the protrusion-element feeding part to feed the protrusion element to the filtering part so as to add a protrusion to the surface of the solid filter material, and when the determination part determines that the protrusion has been added, controls the protrusion-element feeding part to reduce a feeding amount of the protrusion element as compared with when it is determined that the protrusion has not been formed.

23. The suspended-matter removing apparatus according to claim 22, wherein the control part controls the protrusion-element feeding part to stop feeding of the protrusion element, when the determination part determines that the protrusion has been added.

24. The suspended-matter removing apparatus according to claim 22, further comprising an SBS adding part that is connected to an upstream side of the filtering part and adds sodium hydrogen sulfite to the water to be treated before being passed through the filtering part.

* * * * *